(12) United States Patent
Fujii

(10) Patent No.: US 7,136,581 B2
(45) Date of Patent: Nov. 14, 2006

(54) IMAGE TAKING APPARATUS AND PROGRAM PRODUCT

(75) Inventor: Shinichi Fujii, Osaka (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 163 days.

(21) Appl. No.: 10/901,734

(22) Filed: Jul. 29, 2004

(65) Prior Publication Data

US 2005/0031325 A1    Feb. 10, 2005

(30) Foreign Application Priority Data

Aug. 6, 2003    (JP)    ............................. 2003-287780

(51) Int. Cl.
*G03B 17/00*    (2006.01)
*G06K 9/00*    (2006.01)

(52) U.S. Cl. ................. 396/54; 396/124; 396/153; 382/103; 348/169

(58) Field of Classification Search ........ 396/121–124, 396/147, 153, 54; 348/169, 170, 345, 208.1, 348/208.12, 208.14; 382/103, 107
See application file for complete search history.

(56) References Cited

U.S. PATENT DOCUMENTS

| 5,031,049 A | 7/1991 | Toyama et al. ............. 358/227 |
| 5,270,767 A * | 12/1993 | Hamada et al. ............... 396/54 |
| 5,512,974 A * | 4/1996 | Abe et al. .................... 396/153 |
| 5,546,125 A | 8/1996 | Tomitaka et al. ........... 348/169 |

FOREIGN PATENT DOCUMENTS

| JP | 60-263584 A | 12/1985 |
| JP | 6-22195 A | 1/1994 |
| JP | 2000-188713 A | 7/2000 |
| JP | 2003-156680 A | 5/2003 |
| JP | 2003-163827 A | 6/2003 |

* cited by examiner

Primary Examiner—W. B. Perkey
(74) Attorney, Agent, or Firm—Sidley Austin LLP

(57) ABSTRACT

AF is started in response to the depression of a shutter button 61 by the user, and a plurality of images are obtained in succession with a time interval while a first image and a second image are obtained in this order with a time interval by a CCD 11. With respect to the AF area, of the first image, set so as to be used for the evaluation of the focus condition, the number of pixels belonging to a region in a predetermined color space is counted, and with respect to a plurality of color evaluation areas (the area corresponding to the AF area and a plurality of areas in the vicinity thereof) set for the second image, the number of pixels belonging to the region in the predetermined color space is counted. Then, the amount of shift between the color evaluation area where the number of pixels closest to the number of pixels counted with respect to the first image is counted, and the AF area is detected as the object movement amount.

22 Claims, 15 Drawing Sheets

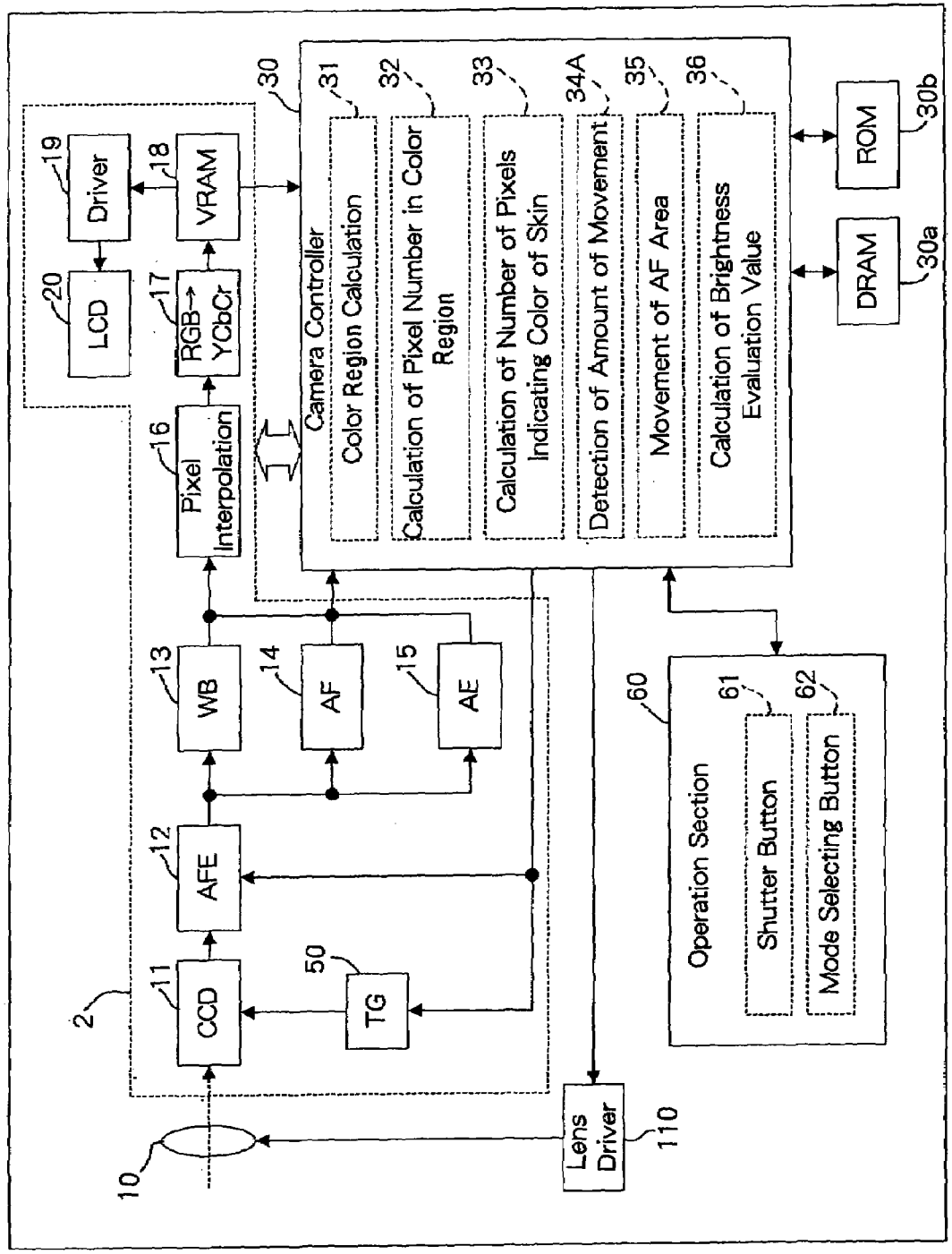

IMAGE TAKING APPARATUS AND PROGRAM PRODUCT

This application is based on application No. 2003-287780 filed in Japan, the content of which is hereby incorporated by reference.

BACKGROUND OF THE INVENTION

1. Field of the Invention

The present invention relates to an image taking apparatus such as a digital camera.

2. Description of the Related Art

Conventionally, as an automatic focusing (hereinafter, sometimes abbreviated as AF as required) technology for image taking apparatuses such as digital cameras, one has been known that, paying attention to a certain area of the image, evaluates the in-focus degree of the object by obtaining an evaluation value such as the contrast from the area. In this case, automatic focusing is performed by determining the lens position where the object image is in focus by detecting the lens position where the evaluation value is highest by stepwisely driving the taking lens. For such a technology, in order to accurately evaluate the focus condition of the object, it is desired to use an evaluation value that comparatively largely changes with the driving of the taking lens.

When automatic focusing is performed, there are cases where the object moves within the image plane during automatic focusing because of a camera movement or shake, or a movement of the object. For this reason, conventionally, the following has also been performed: the image planes of a plurality of images that are continuous in time are each divided into a plurality of area, and a movement of the object is detected by detecting an evaluation value change with time in each area. For such movement detection using an evaluation value for automatic focusing, in order to accurately detect a movement of the object within the image plane, it is desired that there be few image changes due to factors other than the movement of the object between the images for evaluating the movement of the object.

However, in the above-described movement detection, since a movement of the object within the image plane is detected by use of an evaluation value for automatic focusing, the driving of the taking lens is performed while a plurality of images for evaluating a movement of the object are obtained, so that the object movement detection is performed with images of different defocus amounts. Consequently, according to the conventional movement detection, a large evaluation value change occurs due to a defocus amount change as a factor other than a movement of the object, so that the possibility is high that a movement of the object is mis-detected.

SUMMARY OF THE INVENTION

Accordingly, the present invention is made in view of the above-mentioned problem, and an object thereof is to provide an image taking apparatus capable of accurately detecting a movement of the object.

To solve the above-mentioned problem, one aspect of the present invention comprises: an image capturing part obtaining a first image and a second image in this order with a time interval based on an optical image of an object; area setting part for setting a first comparison area for the first image and setting a second comparison area for the second image; and first movement detector for detecting a movement of the object by comparing chromatic information of the first comparison area with chromatic information of the plurality of second comparison areas.

Here, the "detection of the movement of the object" may be any of detections based on various parameters such as the movement amount and the movement direction or the position after the movement, and is not limited to that configuration.

Another aspect of the present invention is a program product executed by a computer included in an image taking apparatus to thereby cause the image taking apparatus to operate so as to obtain a first image and a second image in this order with a time interval based on an optical image of an object, to set a first comparison area for the first image, to set a second comparison area for the second image, and to detect a movement of the object by comparing chromatic information of the first comparison area with chromatic information of the second comparison area.

Further aspect of the present invention is a program product containing a program, execution of the program contained in the program product by a computer included in an image taking apparatus causes the image taking apparatus to operate so as to obtain a first image and a second image in this order with a time interval based on an optical image of an object, to set a first comparison area for the first image, to set a second comparison area for the second image, and to detect a movement of the object by comparing chromatic information of the first comparison area with chromatic information of the second comparison area.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 15 is a block diagram showing the principal functional structure of an image taking apparatus according to a second embodiment.

DETAILED DESCRIPTION OF THE PREFERRED EMBODIMENTS

Hereinafter, embodiments of the present invention will be described with reference to the drawings.

1. First Embodiment

1—1. Functional Structure of the Image Taking Apparatus

Figure 1:
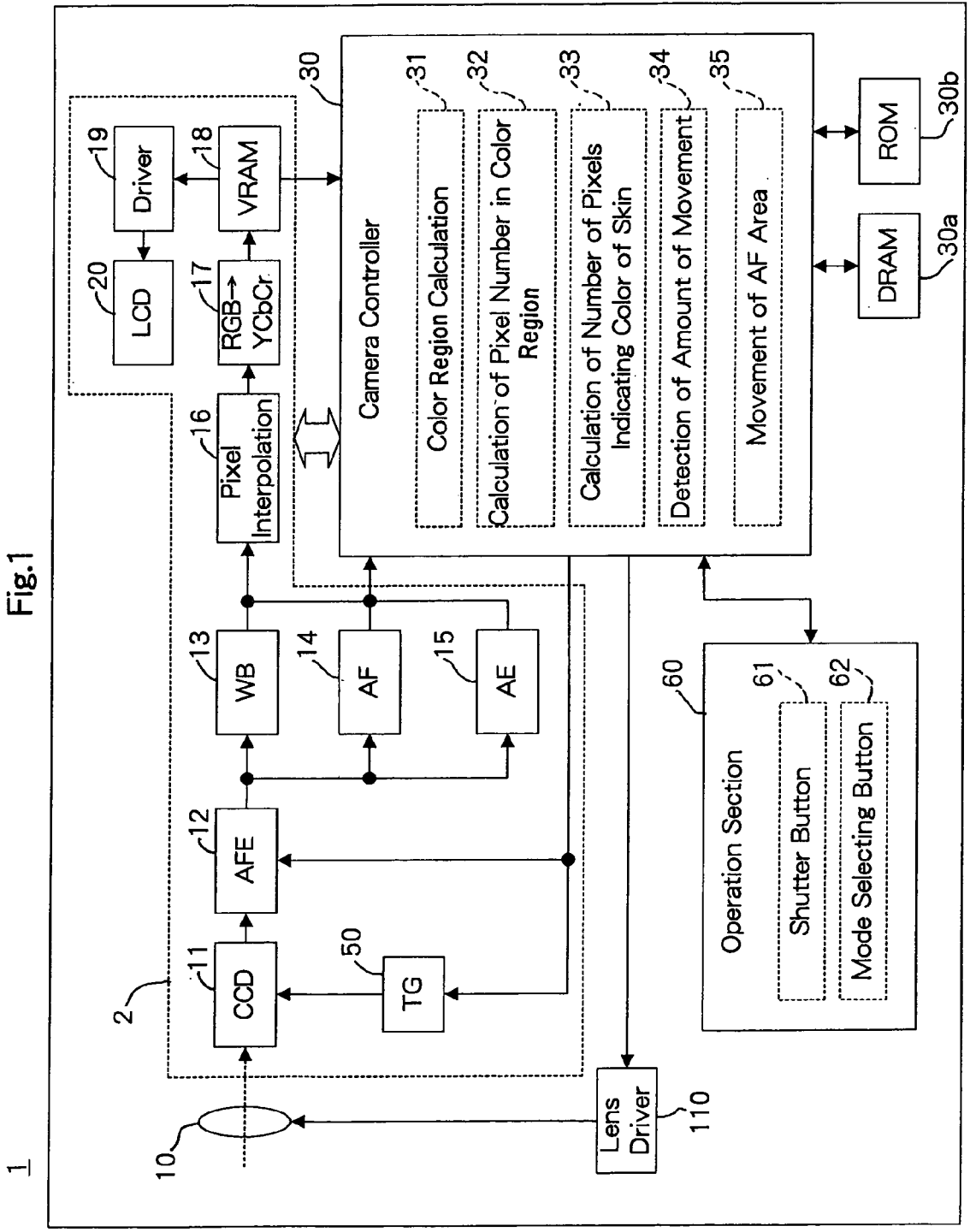
FIG. 1 is a block diagram showing the principal functional structure of an image taking apparatus of a first embodiment.

FIG. 1 showing a first embodiment of the present invention is a block diagram showing the principal functional structure of an image taking apparatus (digital camera) 1. As shown in FIG. 1, the image taking apparatus 1 mainly comprises: a taking lens 10 having a plurality of lens elements; an image capturing part 2; an operation part 60; and a camera controller 30.

In FIG. 1, the operation part 60 comprises a shutter start button (hereinafter, abbreviated as "shutter button") 61 and a mode switching button 62. The shutter button 61 is a two-stroke switch, like that adopted by cameras using film, where a half depressed condition (hereinafter, referred to as "S1 condition") and a fully depressed condition (hereinafter, referred to as "S2 condition") are detectable. The mode switching button 62 is a button for switching among various photographing modes such as a portrait mode for taking an image of a person and a sport mode for taking an image of a moving object.

A CCD image sensor (hereinafter, abbreviated as "CCD") 11 has 2560×1920 pixels, and photoelectrically converts an optical image of the object formed by the taking lens 10 into an image signal (signal comprising trains of pixel signals accumulated at the pixels) of color components of R (red), G (green) and B (blue). At the time of live view capturing, the CCD 11 attains the function of obtaining a plurality of images in succession with a time interval while obtaining a first image and a second image in this order with a time interval based on an optical image of the object.

A timing generator (hereinafter, abbreviated as "TG") 50 generates various timing pulses for controlling the driving of the CCD 11.

The CCD 11 has two driving methods (readout modes), a draft mode and an actual capturing mode.

The draft mode is a readout mode for generating a preview image before capturing to obtain an image for recording (hereinafter, referred to as "actual capturing") is performed, and is employed at the time of so-called live view display. Signal readout from the CCD 11 is generally performed every horizontal line. For this reason, in the draft mode, when pixel signals of each horizontal line are read out from the CCD 11 having 2560 pixels in the horizontal direction and 1920 pixels in the vertical direction, the CCD 11 is driven so that one of every eight lines is read out. That is, in the draft mode, horizontal lines are read out under the condition of being thinned out to ⅛. Consequently, the image outputted from the CCD11 in the draft mode comprises 2560×240 pixels.

The actual capturing mode is a mode to read out pixel signals with all of the 2560×1920 pixels. The TG 50 controls the driving timing of the CCD 11 in the specified one-of these readout modes.

The exposure control at the CCD 11 is performed by adjusting, by a lens driver 110, the aperture stop in the taking lens 10 and the exposure amount of the CCD 11, that is, the charge accumulation time of the CCD 11 corresponding to the shutter speed. In this example, in a case where an appropriate shutter speed cannot be set when the object brightness is low, the level of the image signal (image data) outputted from the CCD 11 is adjusted to thereby compensate for inappropriate exposure due to underexposure. That is, when the object brightness is low, exposure control is performed by a combination of the aperture stop, the shutter speed and the gain adjustment in an analog front end (hereinafter, abbreviated as "AFE") 12.

The TG 50 generates driving control signals of the CCD 11 based on a reference clock transmitted from the camera controller 30. The TG 50 generates, for example, timing signals for starting and ending accumulation (starting and ending exposure) and clock signals such as light reception signal readout control signals (horizontal synchronizing signals, vertical synchronizing signals, transfer signals, etc.) of the pixels, and outputs the generated signals to the CCD 11.

The AFE 12 performs analog signal processing on the analog image signal (analog image data) outputted from the CCD 11, and converts the analog image signal into digital image data. The AFE 12 comprises a CDS (correlated double sampling) circuit, an AGC (automatic gain control) circuit, and an A/D (analog to digital) converter. At the AFE 12, noise reduction of the image signal is performed by the CDS circuit, the level adjustment of the image signal is performed by adjusting the gain by the AGC circuit, and the pixel signals of the analog image signal is converted into digital signals of, for example, 12 bits by the A/D converter.

A WB (white balance) circuit 13 performs level conversion of the pixel data of the color components of R, G and B. The WB circuit 13 converts the level of the pixel data of the color components of R, G and B by use of a level conversion table stored in the camera controller 30. The parameters (characteristic inclinations) of the color components of the level conversion table are automatically or manually set for every captured image by the camera controller 30.

A pixel interpolator 16 converts black-and-white (monochrome information comprising only brightness) image data transmitted from the WB circuit 13 into color image data by performing interpolation based on the color filter characteristic of the CCD 11.

A color conversion and color correction circuit (hereinafter, sometimes referred to as "RGB→YCbCr conversion circuit" as required) 17 converts the image data of the RBG colorimetric system inputted from the pixel interpolator 16 into image data of the YCbCr colorimetric system. At the RGB→YCbCr conversion circuit 17, color correction to improve color reproducibility is performed on the image data as required.

A VRAM 18 is for, at the time of live view capturing, temporarily storing the image data obtained by the CCD 11 in order to output it to an LCD display (hereinafter, abbreviated as "LCD") 20.

At the time of live view capturing, a live view is displayed on the LCD 20 by image data being transmitted from the VRAM 18 to the LCD 20 through a driver 19. Here, the driver 19 displays a pointer (hereinafter, referred to as "AF area pointer"), indicative of the current position of the area (hereinafter, referred to as "AF area") which is the subject of the automatic focusing (AF) control, so as to be superimposed on the live view image displayed on the LCD 20. That is, the LCD 20 attains the function of providing a position mark (AF area pointer) indicative of the position of the main object together with the image obtained by the CCD 11.

Thus, in the image taking standby state of the image taking apparatus 1, the pixel signals of the image data (image) captured every 1/30 second by the CCD 11 undergo predetermined signal processing at the members from the AFE 12 to the RGB→YCbCr conversion circuit 17, and are then displayed on the LCD 20 through the VRAM 18 and the driver 19 (live view display). This enables the user to visually confirm the object image captured by the CCD 11.

Although not shown, at the time of live view display, for example, before or after the VRAM 18, a live view image having 320×240 pixels finally is generated by further thinning out to 1/8 in the horizontal direction the image having 2560×240 pixels which image has been thinned out to 1/8 in the vertical direction at the CCD 11, and image data of an image size appropriate for the number of display pixels (320×240 pixels) of the LCD 20 is generated.

Moreover, the VRAM 18 outputs image data of the YCbCr colorimetric system also to the camera controller 30, and at the camera controller 30, chromatic information is evaluated based on the inputted image data.

At an automatic focusing evaluation value calculator 14, when the shutter button 61 is half-depressed into the S1 condition, evaluation value calculation for performing AF according to the contrast method is performed.

The AF evaluation value calculator 14 sets an AF area for the captured image data (image) inputted from the AFE 12. That is, the AF evaluation value calculator 14 attains the function of setting an AF area (focus evaluation area) for evaluating the focus condition for the image (for example, the second image) obtained by the CCD 11.

Then, with respect to the data corresponding to the set AF area, the evaluation value (hereinafter, referred to as "AF evaluation value") which is the sum of the absolute values of the differences associated with adjoining pixels is calculated by the AF evaluation value calculator 14. Then, the taking lens 10 is driven under the control of the camera controller 30, and the lens position where the AF evaluation value is highest is regarded as the in-focus position. With this, since focusing is performed by driving the taking lens 10 for the AF area, in-focus condition can be obtained with respect to the main object.

In the image taking apparatus 1, when the shutter button 61 is brought in the S1 condition, first, AF to bring the main object in the AF area into focus (hereinafter, referred to as "one-shot AF") is performed, and subsequently, AF to maintain the in-focus condition with respect to the main object until the shutter button 61 is fully depressed into the S2 condition (hereinafter, referred to as "continuous AF") is started.

An automatic exposure (AE) controller 15 is capable of performing multi-area metering where the image data outputted from the AFE 12 is divided into, for example, 300 (20×15) blocks and metering data is calculated block by block. The average value of the pixel values of the color component of, for example, G is calculated as the object brightness, and outputted to the camera controller 30. The camera controller 30 realizes AE by calculating the exposure control value (the aperture value, the shutter speed, and the gain) based on the inputted object brightness value and controlling the members.

A DRAM 30a is a memory for temporarily storing the image data (still image) obtained by the CCD 11 and having undergone the above-described image processing. The DRAM 30a has a storage capacity corresponding to at least several frames. That is, the DRAM 30a at least has a storage capacity corresponding to several frames in which each frame has 2560×1920 pixels corresponding to the number of pixels of the CCD 11, and each pixel data is stored in the corresponding pixel position. Moreover, the DRAM 30a is capable of temporarily storing calculated various numerical values.

The camera controller 30 comprises a microcomputer (CPU), and by reading various programs and the like stored in a ROM 30b, systematically controls the driving of the above-described members of the image taking apparatus 1, thereby performing centralized control of the operation of the image taking apparatus 1. That is, by the CPU reading a predetermined program stored in the ROM 30b, object following AF described later or the like can be realized.

The ROM 30b can be a rewritable memory. In such a case, the stored programs can be updated or upgraded by reading a program supplied by a computer readable medium such as CD-ROM, optical disk or magnetic disc or through computer network to store the program in the rewritable memory.

Moreover, the camera controller 30 has the function of controlling the lens position, the aperture diameter and the like of the taking lens 10 by transmitting a control signal to the lens driver 110. At the time of live view capturing, the camera controller 30 first performs control so that one-shot AF is performed, and subsequently, performs control so that continuous AF to maintain the in-focus condition with respect to the main object in the AF area is performed while a focus lens unit in the taking lens 10 is moved toward the object side and the image plane side. The movement or the position of the focus lens unit in the taking lens 10 will be represented simply as the movement or the position of the taking lens 10, hereinafter. One-shot AF and continuous AF will be further described later.

Moreover, the camera controller 30 has various functions (hereinafter, referred to as "object following AF functions") realizing an operation (hereinafter, referred to as "object following AF") to move and change the position of the AF area set for the image data obtained in succession with, a time interval so as to follow the main object in accordance with a movement of the main object at the time of continuous AF.

The object following AF functions comprise the functions of a color region calculator 31, an in-color-region pixel number calculator 32, a skin color pixel number calculator 33, a movement amount-detector 34, and an AF area mover 35.

The color region calculator 31 calculates the region (predetermined color region) of a color mainly included in the AF area. The in-color-region pixel number calculator 32 calculates the number of pixels showing the CbCr value belonging to the predetermined color region with respect to the AF area and predetermined neighboring areas. The skin color pixel number calculator 33 calculates the number of pixels showing the CbCr value belonging to a skin color region with respect to the AF area and the predetermined neighboring areas. The movement amount detector 34 detects the object movement amount based on a color change in the images obtained in succession with a time interval. The AF area mover 35 moves and changes the set position of the AF area for the image data (image) obtained by the CCD 11 based on the object movement amount detected by the movement amount detector 34.

In this example, when the portrait mode is set by the mode switching button 62, since it is considered that the main object is a person, object following AF to follow the skin color is performed. When the portrait mode is not set, since the color of the main object is unknown, object following AF to recognize a color mainly included in the AF area and follow the color is performed. Details of the object following AF will be further described later.

When the shutter button 61 is fully depressed into the S2 condition, actual capturing for obtaining a captured image for recording is performed. That is, the pixel signals of the image obtained by the CCD 11 undergo predetermined signal processing at the members from the AFE 12 to the RGB→YCbCr conversion circuit 17 and are compressed by the camera controller 30, and then, a captured image for recording is stored onto a memory card.

1-2. One-shot AF

Figure 2:
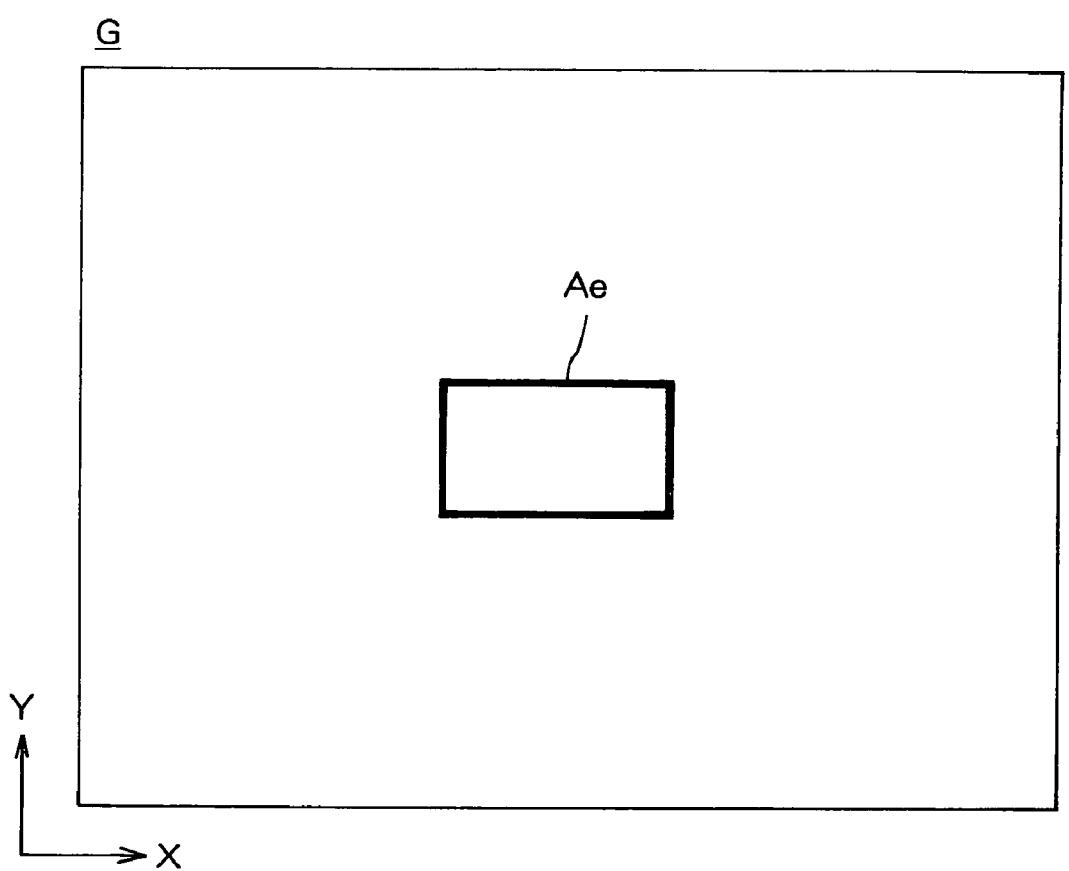
FIG. 2 is a view illustrating the AF area in one-shot AF.

FIG. 2 is a view illustrating the position of the AF area set for an image G in one-shot AF. In FIG. 2 and succeeding figures, in order to clarify the relationship between the horizontal direction and the vertical direction with respect to the image, X- and Y-axes are added as required.

As shown in FIG. 2, in one-shot AF, the AF evaluation value calculator 14 sets an area (AF area) Ae which is the object for the calculation of the AF evaluation value, in the vicinity of the center of the image G continuously inputted from the AFE 12 in succession every 1/30 second. Although the actual image is thinned out to 1/8 in the vertical direction as-described above, in FIG. 2 and succeeding figures, the image is magnified eight times in the vertical direction for easy understanding of the correspondence with the positions of all the pixels at the CCD 11.

The AF evaluation value calculator 14 obtains image data, corresponding to the AF area Ae in the vicinity of the center, of the image G having 2560×240 pixels and inputted from the AFE 12. Then, like the one carried out in the general AF according to the contrast method, a plurality of pieces of image data in the AF area Ae are obtained while the taking lens 10 is driven. Then, the AF evaluation value calculator 14 obtains the evaluation value (AF evaluation value) associated with the focus condition of the taking lens 10 based on the image (image data) in the obtained AF area Ae. The set position of the AF area Ae in one-shot AF is not limited to the vicinity of the center of the image, but may be changeable to various positions according to the setting by the user.

Figure 3:
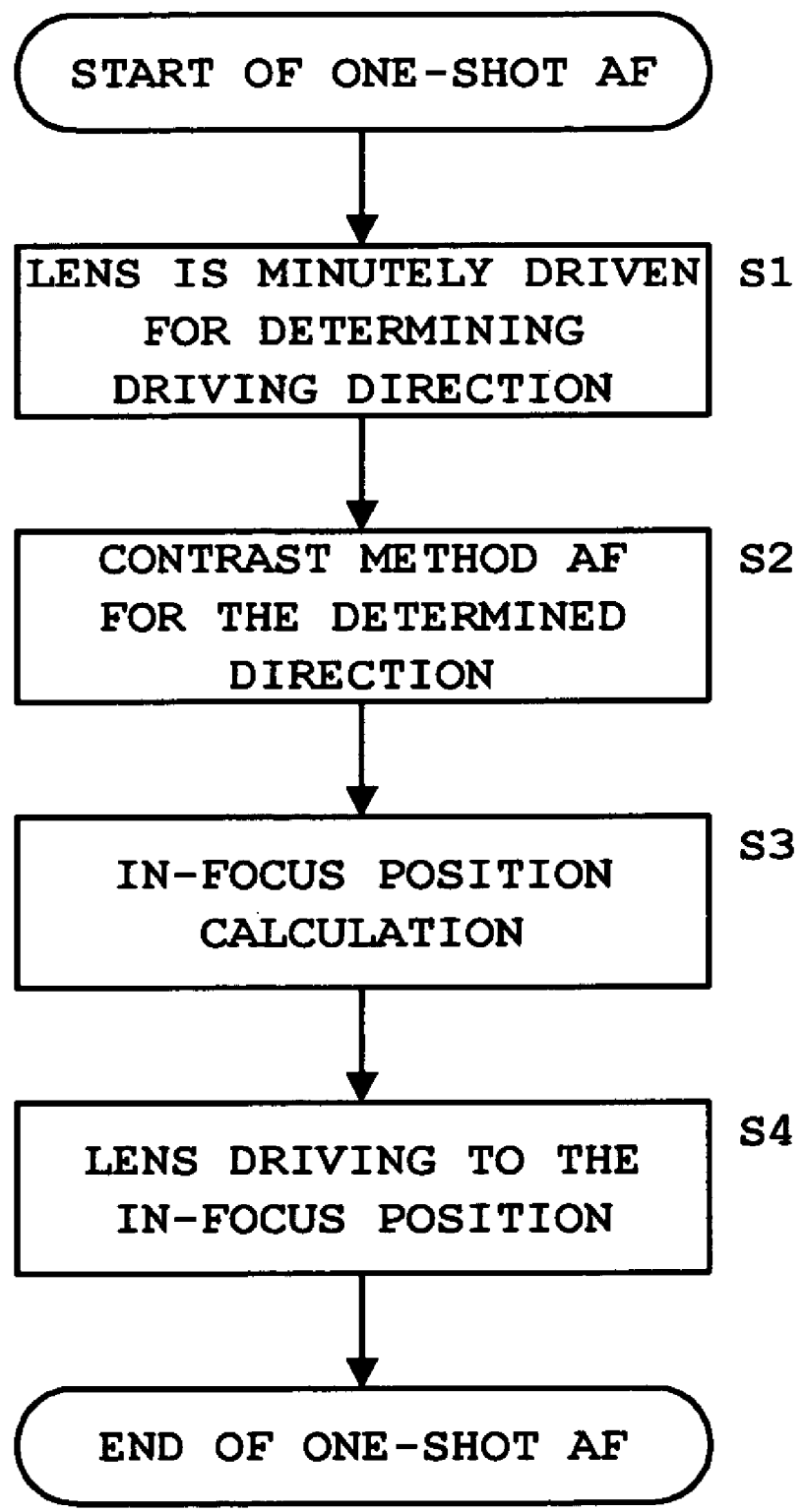
FIG. 3 is a flowchart illustrating an operation flow of one-shot AF.

FIG. 3 is a flowchart illustrating an operation flow of one-shot AF. The operation flow of the one-shot AF is controlled by the camera controller 30. First, when the shutter button 61 is half depressed by the user into the S1 condition under the live view display condition, one-shot AF is started, and the process proceeds to step S1.

At step S1, the taking lens 10 is minutely driven from the initial position to determine the driving direction, and the process proceeds to step S2. In this example, the taking lens 10 is minutely driven from the initial position, and the driving direction of the taking lens 10 in which the AF evaluation value calculated with respect to the AF area Ae increases is set as the driving direction at step S2.

At step S2, automatic focusing (AF) to search for the position where the AF evaluation value is highest is performed in the driving direction determined at step S1, and the process proceeds to step S3. That is, at step S2, images are obtained while the taking lens 10 is driven at predetermined pitches in the driving direction set at step S1, the AF evaluation value is calculated-based on the image data in the AF area Ae, and the driving of the taking lens 10 is continued until the AF evaluation value starts to decrease. That is, when the AF evaluation value starts to decrease, the driving of the taking lens 10 is stopped.

At step S3, the in-focus position of the taking lens 10 is calculated, and the process proceeds to step S4. In this example, the lens position of the taking lens 10 where the AF evaluation value is highest is calculated as the in-focus position by secondary interpolation approximate calculation (calculation by quadratic curve approximation) by use of the maximum value Yn of the AF evaluation values calculated at step S2, AF evaluation values Yn−1 and Yn+1 preceding and succeeding the maximum value Yn, and the lens positions of the taking lens 10 corresponding to the AF evaluation values Yn−1, Yn and Yn+1.

At step S4, the taking lens 10 is driven to the in-focus position calculated at step S3, and one-shot AF is ended.

In the present embodiment, continuous AF to always continue AF is continuously performed after the above-described one-shot AF.

1-3. Continuous AF

Figure 4:
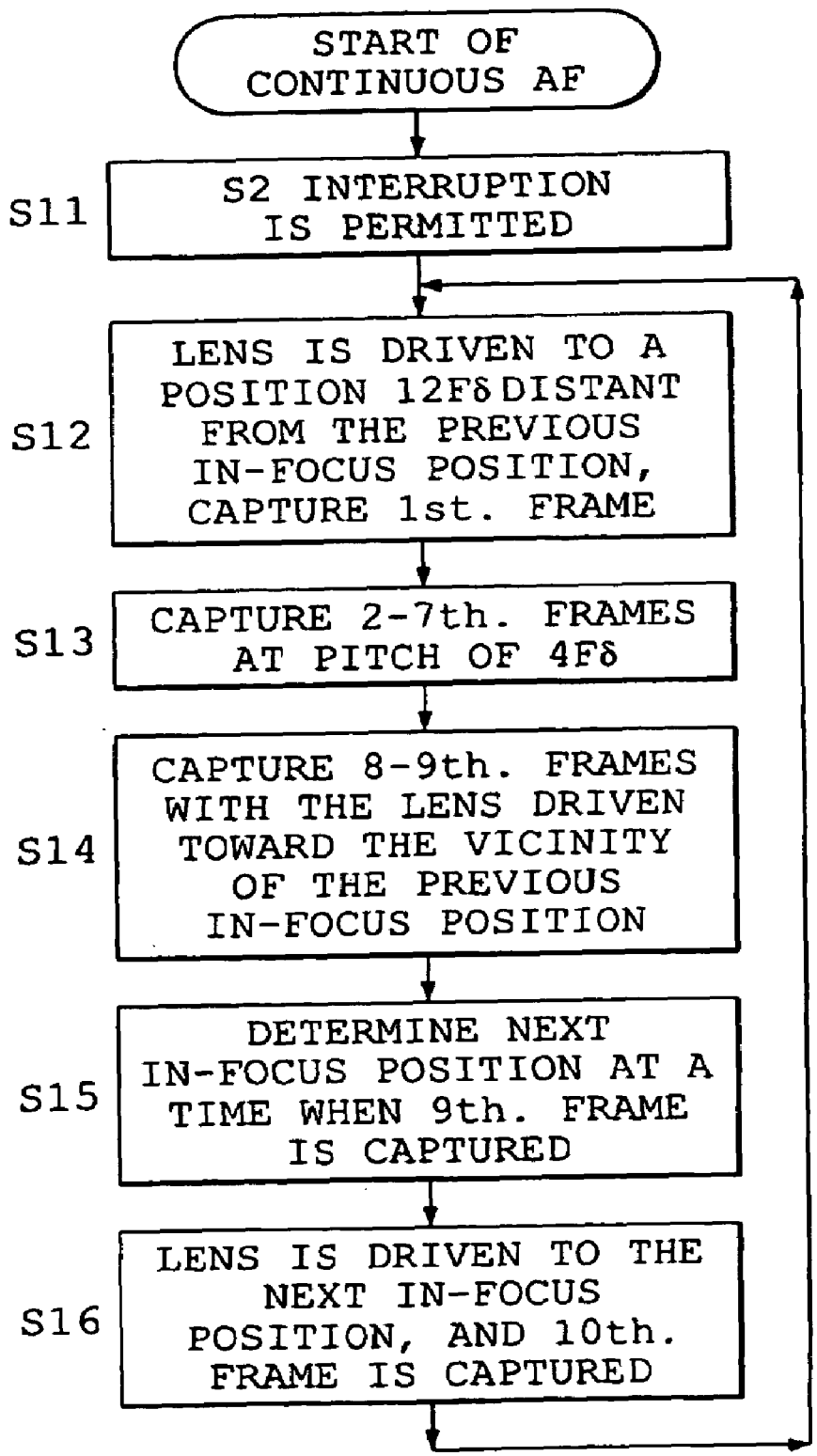
FIG. 4 is a flowchart illustrating an operation flow of continuous AF.

FIG. 4 is a flowchart illustrating an operation flow of the continuous AF. In FIG. 4, of the operation flow of the continuous AF, the driving of the taking lens 10, the image capturing processing and the detection of the next in-focus position are shown. Processings such as the image signal readout from the CCD 11 and the calculation and obtaining of the AF evaluation value are successively performed immediately after each image capturing processing is performed. The operation flow of the continuous AF is controlled by the camera controller 30.

Figure 5:
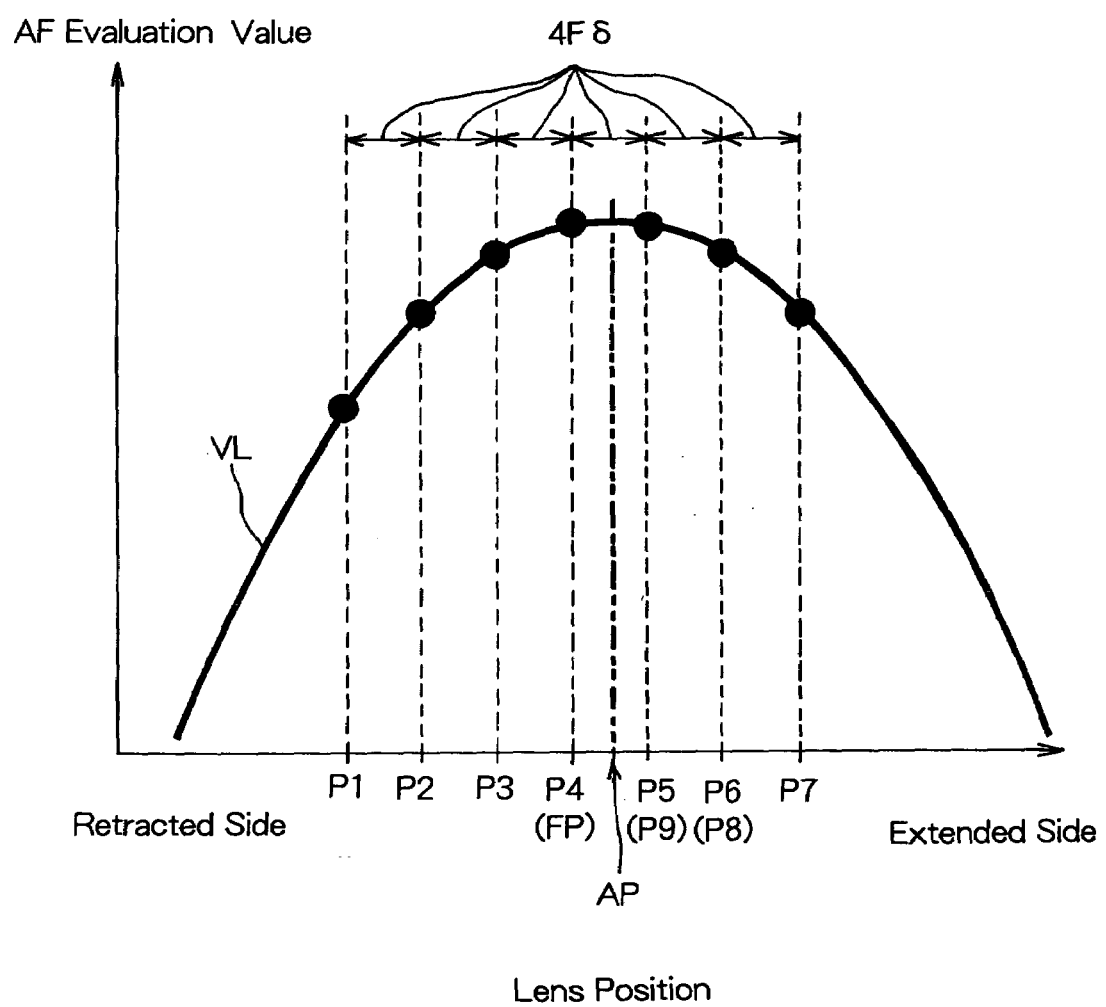
FIG. 5 is a view illustrating a relationship between the position of the taking lens and an AF evaluation value.

FIG. 5 is a view illustrating a curve VL representative of a relationship between the position of the taking lens 10 and the AF evaluation value. In FIG. 5, the previously detected in-focus position is shown as a lens position FP, and the in-focus position detected next is shown as a lens position AP.

Here, F represents the f-number of the taking lens 10, and δ represents the so-called permissible circle of confusion of the CCD 11. As shown in FIG. 5, in continuous AF, the following series of AF operations are repetitively performed: At the previously-detected in-focus position FP and three positions at pitches of 4F δ on each side of the position FP, a total of seven taking lens positions (P1 to P7), images are obtained, and the AF evaluation values are calculated. Then, the next lens position AP is detected based on the seven AF evaluation values, and the taking lens 10 is driven to the lens position AP.

With reference to FIG. 5, the operation flow of the continuous AF shown in FIG. 4 will be described. When continuous AF is performed, the position of the AF area Ae is moved and changed in accordance with the movement of the object as mentioned above.

In this example, when the above-described one-shot AF is ended, continuous AF is started, and the process proceeds to step S11.

At step S11, an interruption to S2 condition is set to be permitted, and the process proceeds to step S12. In this example, when the shutter button 61 is fully depressed by the user into the S2 condition during the operation flow of the continuous AF, continuous AF is stopped and actual capturing is performed.

At step S12, as shown in FIG. 5, the taking lens 10 is driven to the lens position P1 12 Fδ away from the previous in-focus position toward the image plane side, the first image capturing processing is performed to obtain the first image (first frame), and the process proceeds to step S13.

At step S13, as shown in FIG. 5, the second to seventh image capturing processings are successively performed to successively obtain the second to seventh images (second to seventh frames) at the lens positions P2 to P7 while the taking lens 10 is driven toward the object side at pitches of 4Fδ, and the process proceeds to step S14.

At step S14, the eighth and ninth image capturing processings are successively performed to successively obtain the eighth and ninth images (eighth and ninth frames) at lens positions P8 and P9 while the taking lens 10 is driven to the vicinity of the previous in-focus position FP.

At step S15, the next in-focus position AP is detected when the ninth frame is obtained, and the process proceeds to step S16. In this example, secondary interpolation approximate calculation is performed with respect to the AF evaluation values calculated with respect to the first to seventh frames, and the lens position AP where the AF evaluation value is highest is detected as the next in-focus position.

At step S16, the taking lens 10 is driven to the next in-focus position AP detected at step S15, and the tenth image capturing processing is performed to obtain the tenth image (tenth frame), and the process returns to step S12.

1-4. Capturing Including Object Following AF

After one-shot AF is ended, the camera controller 30 detects the object movement amount by evaluating the colors (in this example, the data of a color difference signal CrCb) of the images obtained in succession with a time interval from the VRAM 18.

For example, in this example, when the portrait mode is not set, an area having chromatic information approximate to the chromatic information of the AF area when one-shot AF is performed is detected while images are obtained in succession with a time interval, and the shift amount from the AF area at that point of time is detected, whereby the movement amount detector 34 detects the object movement amount.

When the portrait mode is set, since it is considered that a person is the main object, of a plurality of evaluation areas comprising the area previously set as the area to be set as the AF area and neighboring areas, the evaluation area having the number of pixels of the skin color (the number of skin color pixels) approximate to the number of skin color pixels present in the above set area on the image of the previous frame is detected while images are obtained in succession with a time interval, and the shift amount from the set area is detected, whereby the movement amount detector 34 detects the object movement amount.

Then, based on the object movement amount detected by the movement amount detector 34, the AF area mover 35 moves and changes the set position of the AF area provided for the image.

1-4-1. Evaluation Area Setting

Paying attention to two frames that are continuous in time among frames obtained in succession with time intervals at the time of continuous AF, the setting of the evaluation area for detecting the object movement amount will be described.

In this example, since the method of setting the evaluation area for detecting the object movement amount in the horizontal direction and the method of setting the evaluation area for detecting the object movement amount in the vertical direction are similar to each other, the method of setting the evaluation area for detecting the object movement amount in the horizontal direction will be described as an example.

FIGS. 6 and 7(A) to 7(G) are views illustrating color evaluation areas (evaluation areas for chromatic information comparison) CE1 to CE7 set for detecting the object movement amount in the horizontal direction.

Figure 6:
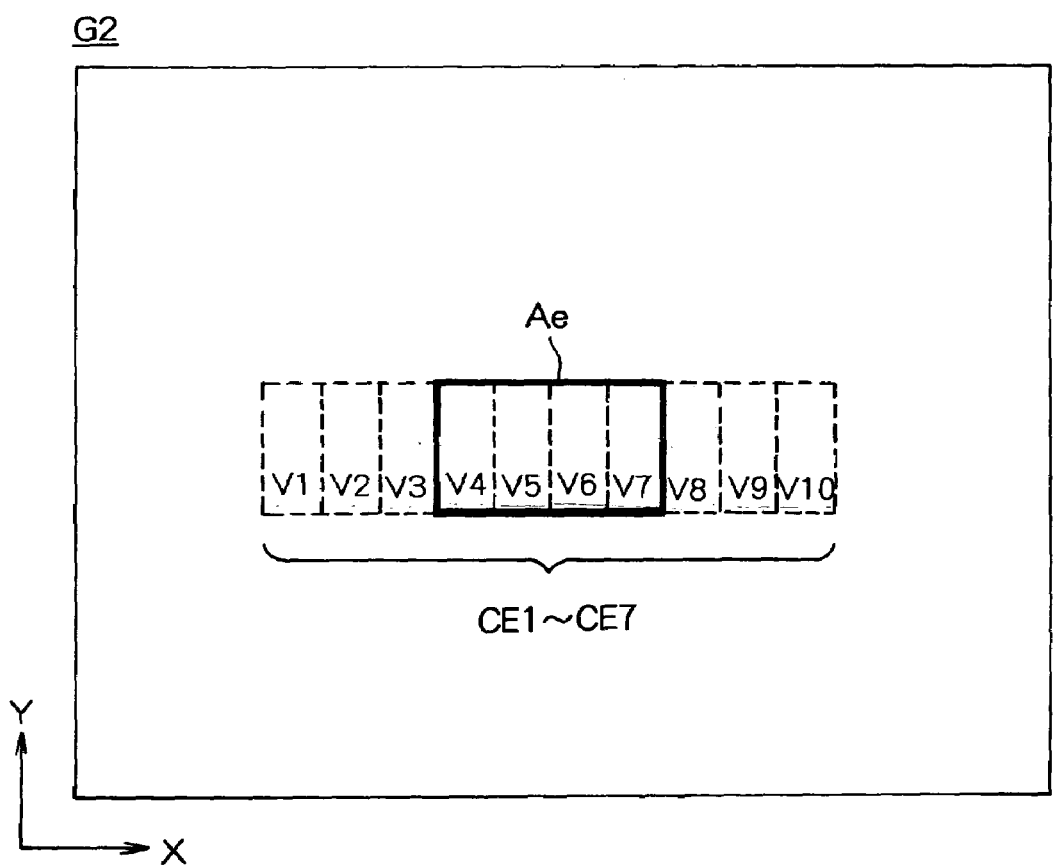
FIG. 6 is a view illustrating a plurality of color evaluation areas for chromatic information comparison.
Figure 7A:
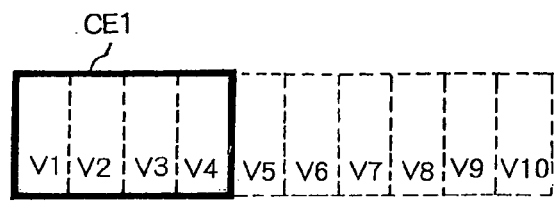
FIGS. 7A to 7G are views illustrating the plurality of color evaluation areas for the chromatic information comparison.
Figure 7B:
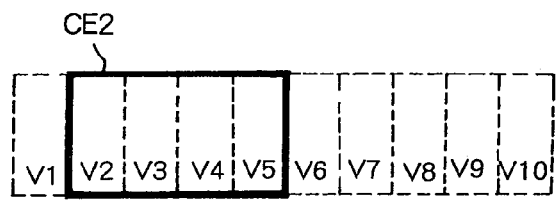
Figure 7C:
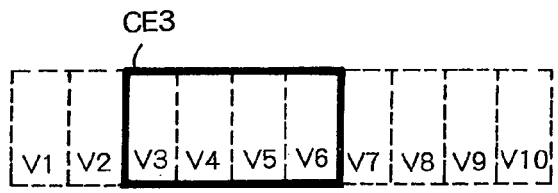
Figure 7D:
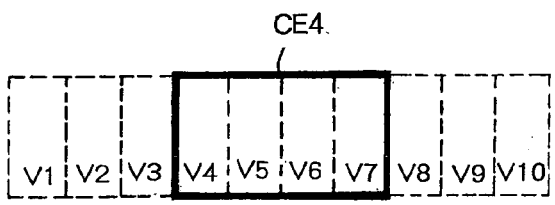
Figure 7E:
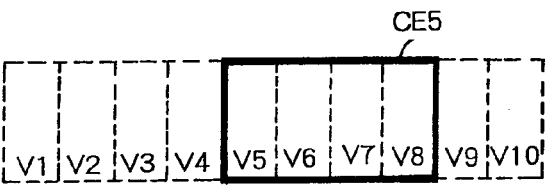
Figure 7F:
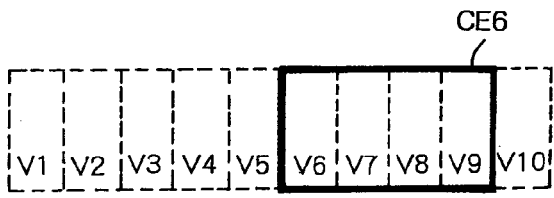
Figure 7G:
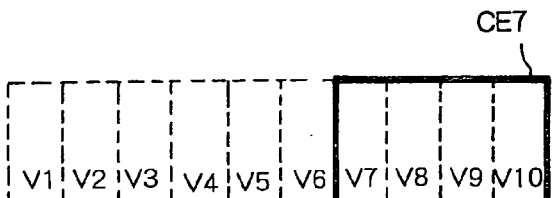

When the image of the first frame (first image) G1 and the image of the second frame (second image) G2 are obtained in succession with a time interval, for example, with respect to the first image, an area Ae set as the area where the AF area is to be set at that point of time (hereinafter, referred to simply as "AF area") is set as shown in FIG. 2. The "area where the AF area is to be set" cited here is first the AF area Ae at the time of one-shot AF, and the method of determining the AF area Ae thereafter will be described later. With respect to the second image G2, for example, seven color evaluation areas (first to seventh color evaluation areas) CE1 to CE7 are set for the second image G2 as shown in FIG. 6. In FIG. 6, the area corresponding to the AF area Ae to be set at that point of time is shown as the AF area Ae.

The set positions of the color evaluation areas CE1 to CE7 will be described. The color evaluation areas CE1 to CE7 are set by the camera controller 30.

For example, as shown in FIG. 6, for the second image G2, ten vertically elongated rectangular areas (hereinafter, referred to as "vertically elongated areas") V1 to V10 having a similar shape and area are set so as to adjoin each other in the horizontal direction. At this time, the vertically elongated areas V1 to V10 are set so that, of the ten vertically elongated areas V1 to V10, the area comprising the central four vertically elongated areas V4 to V7 is equal to the AF area Ae.

Then, as shown in FIGS. 7A to 7G, the seven color evaluation areas CE1 to CE7 are set so that the first color evaluation area CE1 is the area comprising the vertically elongated areas V1 to V4, the second color evaluation area CE2 is the area comprising the vertically elongated areas V2 to V5, the third color evaluation area CE3 is the area comprising the vertically elongated areas V3 to V6, the fourth color evaluation area CE4 is the area comprising the vertically elongated areas V4 to V7, the fifth color evaluation area CE5 is the area comprising the vertically elongated areas V5 to V8, the sixth color evaluation area CE6 is the area comprising the vertically elongated areas V6 to V9 and the seventh color evaluation area CE7 is the area comprising the vertically elongated areas V7 to V10.

That is, in the second image G2, the AF area Ae is the fourth color evaluation area, and the first to seventh color evaluation areas CE1 to CE7 having a similar shape and area to the AF area Ae are set so as to be shifted by one vertically elongated area.

In other words, the first to seventh color evaluation areas CE1 to CE7 are set so that with the AF area Ae as the center, the first to third color evaluation areas CE1 to CE3 are disposed in positions slightly shifted in the −X direction and the fifth to seventh color evaluation areas CE5 to CE7 are disposed in positions slightly shifted in the +X direction.

In still other words, in the vicinity of the fourth color evaluation area CE4 equal to the AF area Ae, the seven color evaluation areas CE1 to CE7 successively shifted so as to share three vertically elongated areas are set.

Thus, the camera controller 30 attains the function of setting a first comparison area (in this example, the area, the AF area Ae, that is set so as to be used for the evaluation of the focus condition at that point of time) for the first image G1 and setting a plurality of second comparison areas (in this example, a plurality of color evaluation areas including the area corresponding to the set AF area Ae and not less than one area in the vicinity thereof) for the second image G2. Then, for example, the camera controller 30 sets the color evaluation. areas CE1 to CE7 as areas that include at least two (four in this example) of the rectangular vertically elongated areas (divisional comparison areas) V1 to V10 obtained by dividing one area of the second image into a plurality of areas and overlap at least one (three in this example) of the other color evaluation areas CE1 to CE7. In other words, the color evaluation areas CE1 to CE7 are areas set so as to be successively spatially shifted while overlapping each other.

1-4-2. Capturing Operation Flow in Modes other than the Portrait Mode

Figure 8:
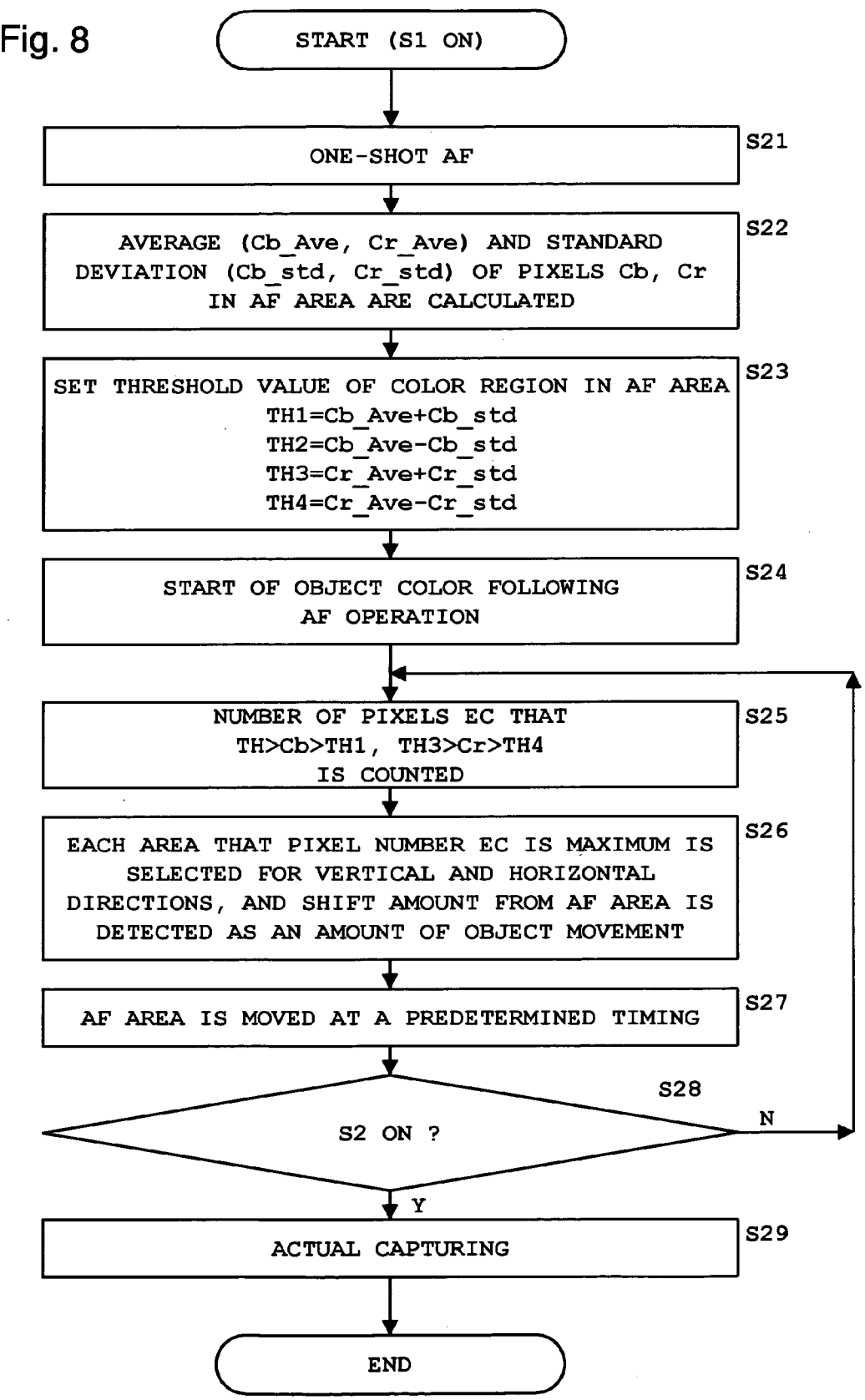
FIG. 8 is a flowchart illustrating a capturing operation flow including an object following AF operation flow when a portrait mode is not set.

FIG. 8 is a flowchart illustrating a capturing operation flow including an object following AF operation flow when the portrait mode is not set. This operation flow is realized under the control of the camera controller 30. In the operation flow shown in FIG. 8, attention is given to, of the object following AF, the movement of the AF area. In actuality, however, during the period from the end of one-shot AF to the setting of the S2 condition, the above-described continuous AF is performed in parallel with the operation flow for moving the AF area.

In this example, when the shutter button 61 is half depressed by the user into the S1 condition in the image taking standby state, the capturing operation flow is started, and the process proceeds to step S21.

At step S21, the above-described one-shot AF is performed, and the process proceeds to step S22. At the time of one-shot AF, the AF area Ae is set, for example, in the vicinity of the center of the image as described above.

At step S22, with respect to the AF area Ae at the time of one-shot AF, the average values Cb_Ave. and Cr_Ave. of the Cb and Cr values of all the pixels, and standard deviations Cb_std. and Cr_std. are calculated, and the process proceeds to step S23.

At step S23, based on the average values of Cb and Cr and the standard deviations calculated at step S22, the threshold value of a general color belonging to the AF area Ae, that is, the region representative of the color in the AF area Ae (hereinafter, referred to as "color region") is set according to the following expressions (1) to (4), and the process proceeds to step S24.

$$TH1=Cb\_Ave.+Cb\_std. \quad (1)$$

$$TH2=Cb\_Ave.-Cb\_std. \quad (2)$$

$$TH3=Cr\_Ave.+Cr\_std. \quad (3)$$

$$TH4=Cr\_Ave.-Cr\_std. \quad (4)$$

Figure 9:
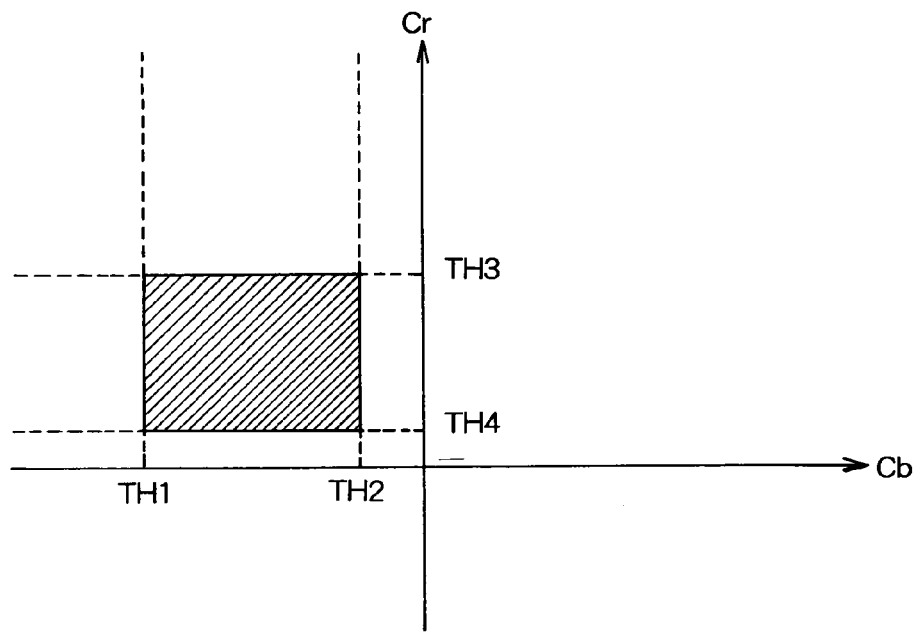
FIG. 9 is a view for explaining the setting of a color region of the object to be followed.

In this example, at the point of time when the user half depresses the shutter button 61 to start AF, a general color of the main object present in the AF area Ae is recognized, and the threshold value of the region (color region) representative of the color of the main object to be followed is set. FIG. 9 is a view for explaining the color region of the object to be followed. FIG. 9 shows a two-dimensional color space where the horizontal axis direction represents Cb and the vertical axis direction represents Cr, and the hatched region is the color region in the AF area Ae.

At step S24, object following-AF (hereinafter, referred to as "object color following AF") following the color of the main object is started, and the process proceeds to step S25.

At step S25, as described above, a plurality of color evaluation areas (for example, the color evaluation areas CE1 to CE7 in the horizontal direction) are set so as to be slightly shifted in the vertical and horizontal directions with the area (AF area) Ae set as the area to be set as the AF area by that point of time (at first, the AF area at the time of one-shot AF) as the center. Then, with respect to the set color evaluation areas, the number of pixels EC satisfying relationships TH2>Cb>TH1 and TH3>Cr>TH4, that is, showing the CbCr value belonging to the hatched predetermined color region in FIG. 9 is counted, and the process proceeds to step S26.

In this example, for example, with respect to the color evaluation areas CE1 to CE7, when the number of pixels EC showing the CbCr value belonging to the predetermined color region is counted, first, the number of pixels showing the CrCb value belonging to the predetermined color region as shown in FIG. 9 is counted with respect to a plurality of vertically elongated areas V1 to V10, and then, the numbers of pixels associated with four vertically elongated areas included in the color evaluation areas CE1 to CE7 are added together, whereby the number of pixels EC showing the CbCr value belonging to the predetermined color region is counted with respect to the color evaluation area CE1 to CE7.

That is, chromatic information of the color evaluation areas is obtained, for example, based on the chromatic information of a plurality of vertically elongated areas V1 to V10. With this structure, when chromatic information of the color evaluation areas is obtained, waste such that the number of pixels of an overlapping part is counted repetitively can be avoided. Consequently, the calculation amount can be reduced, and the processing speed can be increased.

In this example, the chromatic information is the number of pixels belonging to the predetermined color region in the two-dimensional color space represented by Cb and Cr. This chromatic information may be information on the ratio of the area of the image belonging to the predetermined color region in the two-dimensional color space represented by Cb and Cr, that is, the size of the area. With this structure, the object movement amount can be detected based on the number of pixels belonging to the predetermined color region in the two-dimensional color space or information on the size of the area belonging to the predetermined color region. The amount of calculation for calculating the chromatic information is smaller when data associated with the two-dimensional color space of CbCr is used than when data associated with a three-dimensional color space of RGB is used. Consequently, the reliability of the detected object movement amount and the focusing control in accordance with the movement of the object can be improved while complicated calculation is suppressed.

At step S26, of the color evaluation areas set so as to be slightly shifted in the vertical and horizontal directions, the area where the number of pixels EC is highest with respect to the directions is selected based on the result of the counting at step S25, the amount of shift (shift amount) between the selected area and the AF area Ae is detected as the object movement amount in the directions, and the process proceeds to step S27.

That is, in this example, the in-color-region pixel number calculator 32 and the movement amount detector 34 attain in cooperation with each other the function (first movement detection function) of detecting the movement of the object (in this example, the object movement amount) by comparing the chromatic information (in this example, information on the color region representative of the color of the main object) in the position of the AF area Ae of the first image G1 with the chromatic information of a plurality of color evaluation areas (for example, the color evaluation area CE1 to CE7) on the second image G2.

At step S27, the position of the AF area for the image is moved and changed at a predetermined time based on the object movement amount in the vertical and horizontal directions detected at step S26, and the process proceeds to step S28. Here, the predetermined time is, for example, immediately after the object movement amount is detected, and for the image data read in the AF evaluation value calculator 14 immediately after the object movement amount is detected, the AF area Ae is set in the position moved based on the object movement amount.

Thus, the camera controller 30 attains the function of determining the position of the AF area Ae (focus evaluation area) for evaluating the focus condition for the image obtained by the CCD 11 based on the movement of the object detected by the first movement detection function. In this manner, the AF area Ae after one-shot AF is determined.

At step S28, it is determined whether the shutter button 61 is fully depressed by the user into the S2 condition or not. In this example, when the shutter button 61 is in the S2 condition, the process proceeds to step S29, and when the shutter button 61 is not in the S2 condition, the process returns to step S25. That is, until the shutter button 61 is brought into the S2 condition, object color following AF to move and change the AF area in accordance with the movement of the object is performed while images are successively obtained by live view capturing.

At step S29, actual capturing to obtain an image for recording is performed, and the capturing operation flow is ended.

1-4-3. Capturing Operation Flow in the Portrait Mode

When the portrait mode is not set, since the main object is not limited to a person and the color of the main object is not identified, object following AF is realized by recognizing the color region representative of the main object belonging to the AF area Ae at the point of time when object following AF is started, and following the movement of the main object showing the CbCr value belonging to the color region.

On the contrary, when the portrait mode is set, since it is considered that the main object is a person, object following AF is realized by following the skin color of the person's face or the like. Object following AF when the portrait mode is set will be described.

Figure 10:
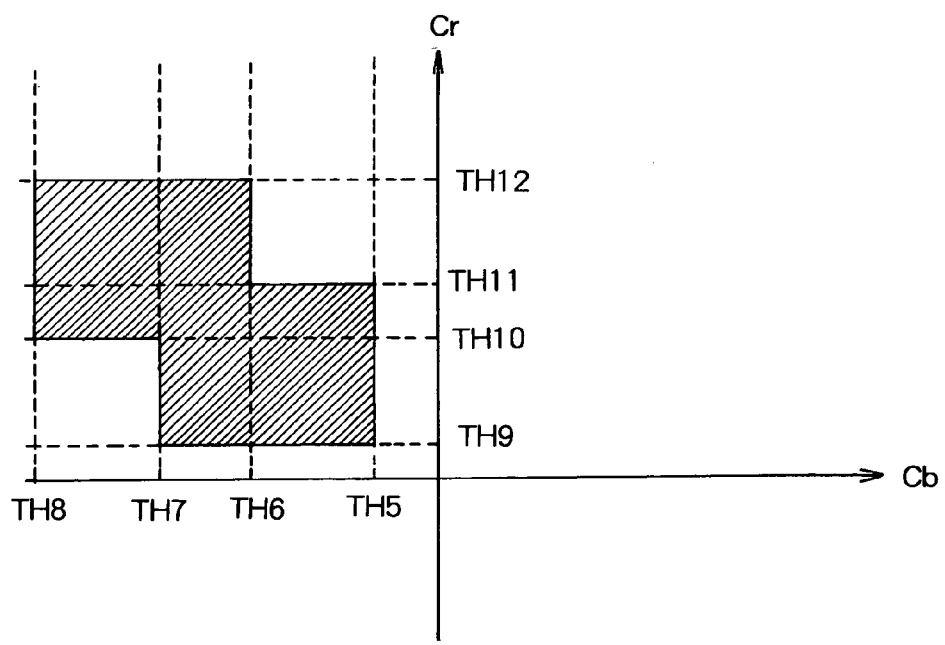
FIG. 10 is a view for explaining the setting of the skin color region to be followed.

FIG. 10 is a view for explaining the setting of the color region representative of the skin color to be followed. FIG. 10 shows a two-dimensional color space where the horizontal axis direction represents Cb and the vertical axis direction represents Cr like FIG. 9, and the hatched region is the color region representative of the skin color (hereinafter, referred to as "skin color region"). As shown in FIG. 10, the skin color region can be roughly approximated as a region satisfying relationships ((TH5>Cb>TH7 AND TH11>Cr>TH9) QR (TH6>Cb>TH8 AND TH12>Cr>TH10)). While the actual skin color region is a substantially elliptic region stretching over both of the regions, it can be approximated as the above-mentioned area.

Figure 11:
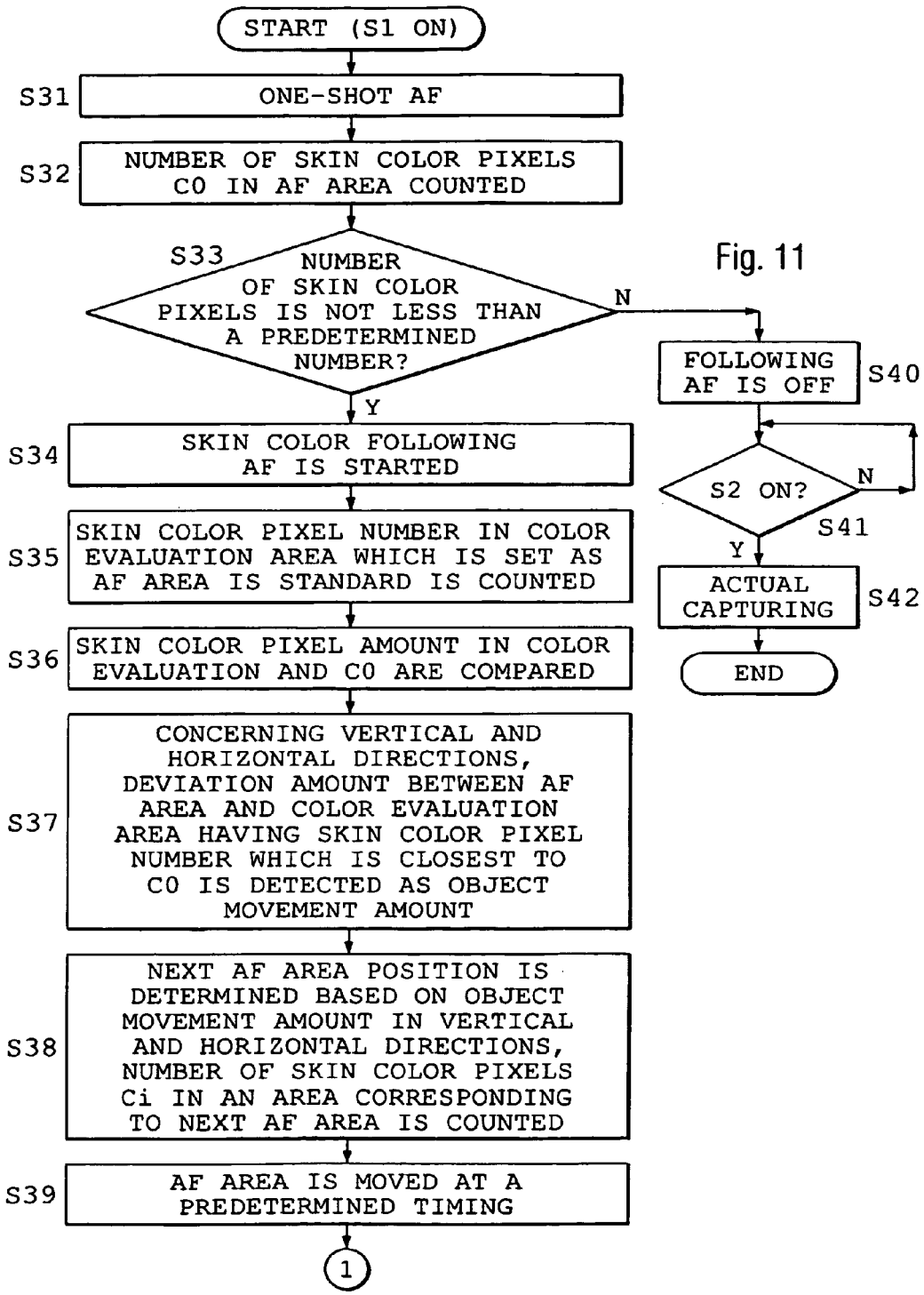
FIG. 11 is a flowchart illustrating a capturing operation flow including an object following AF operation flow when the portrait mode is set.
Figure 12:
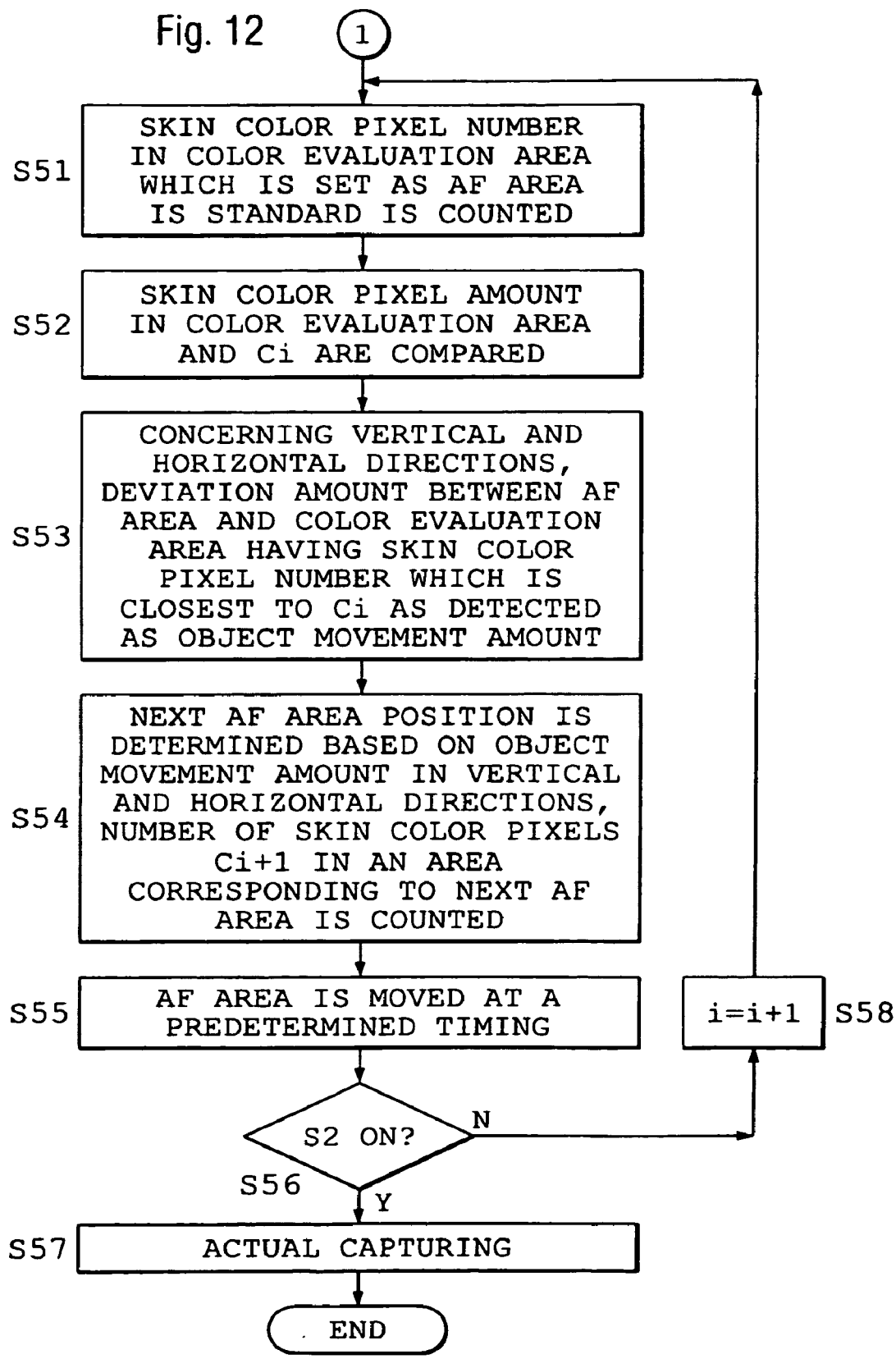
FIG. 12 is a flowchart illustrating the capturing operation flow including the object following AF operation flow when the portrait mode is set.

FIGS. 11 and 12 are flowcharts illustrating a capturing operation flow including an object following AF operation flow when the portrait mode is set. This operation flow is realized under the control of the camera controller 30. In the operation flow shown in FIGS. 11 and 12, like FIG. 8, attention is given to, of the object following AF, the movement of the AF area. However, during the period from the end of one-shot AF to the setting of the S2 condition, the above-described continuous AF is performed in parallel with the operation flow for moving the AF area.

In this example, when the shutter button 61 is half depressed by the user into the S1 condition in the capturing standby state, the capturing operation flow is started, and the process proceeds to step S31.

At step S31, the above-described one-shot AF is performed, and the process proceeds to step S32. At the time of one-shot AF, the AF area Ae is set in the vicinity of the center of the image as described above.

At step S32, the number of pixels (the number of skin color pixels) C0 representative of the skin color in the AF area Ae is counted, and the process proceeds to step S33. In this example, of the pixels in the AF area Ae, the number of pixels showing the CbCr value belonging to the skin color region shown in FIG. 10 is counted.

At step S33, it is determined whether the number of skin color pixels C0 counted at step S32 is not less than a predetermined value or not. In this example, for example, in a case where the number of pixels corresponding to 20 percent of all the pixels in the AF area Ae is a predetermined value Hc, when the number of skin color pixels C0 is not less than the predetermined value Hc, the process proceeds to step S34, and when the number of skin color pixels C0 is less than the predetermined value Hc, the process proceeds to step S40.

The reason why whether the number of skin color pixels C0 is not less than a predetermined value or not is determined is as follows: Since the portrait mode is set, it is considered that the main object is a person. However, for example when the area, of the AF area Ae, occupied by the person is small because the person is situated far away, there is a possibility that the skin color indicating the person cannot be followed accurately, and therefore, the contents of AF are changed according to the number of skin color pixels C0.

First, the case where the process proceeds from step S33 to step S34 will be described.

At step S34, object following AF (hereinafter, referred to as "skin color following AF") following the skin color is started, and the process proceeds to step S35.

At step S35, with respect to the image data obtained by the camera controller 30 immediately after the start of object following AF, as described above, a plurality of color evaluation areas (for example, the color evaluation areas CE1 to CE7) are set so as to be slightly shifted in the vertical and horizontal directions with respect to the AF area Ae. Then, with respect to the set color evaluation areas, the number of skin color pixels satisfying the relationships ((TH5>Cb>TH7 AND TH11>Cr>TH9) OR (TH6>Cb>TH8 AND TH12>Cr>TH10)), that is, showing the CbCr value belonging to the color region shown in FIG. 10 is counted, and the process proceeds to step S36.

At step S36, the number of skin color pixels in each color evaluation area is compared with the number of skin color pixels C0 counted at step S32, and the process proceeds to step S37.

At step S37, with respect to both the vertical and horizontal directions, the amount of shift (shift amount) between the color evaluation area having the number of skin color pixels closest to the number of skin color pixels C0 counted at step S32 and the AF area Ae is detected as the object movement amount in the directions, and the process proceeds to step S38.

At step S38, the position of the next AF area Ae is determined based on the object movement amount in the vertical and horizontal directions detected at step S37, the number of skin color pixels Ci in the area corresponding to the next AF area Ae in the current frame is counted, and the process proceeds to step S39.

At step S39, at a predetermined time, the position of the AF area for the image is moved and changed to the position of the AF area Ae determined at step S38, and the process proceeds to step S51 in FIG. 12. Here, the predetermined time is, for example, immediately after the object movement amount is detected, and for the image data read in the AF evaluation value calculator 14 immediately after the object movement amount is detected, the AF area Ae is set in the position moved based on the object movement amount.

At step S51, a plurality of color evaluation areas (for example, the color evaluation areas CE1 to CE7) are set for the image so as to be slightly shifted in the vertical and horizontal directions with respect to the AF area Ae moved and set at step S39 or step S55 described later. Then, with respect to the set color evaluation areas, the number of skin color pixels satisfying the relationship ((TH5>Cb>TH7 AND TH11>Cr>TH9) OR (TH6>Cb>TH8 AND TH12>Cr>TH10)), that is, showing the CbCr value belonging to the color region shown in FIG. 10 is counted, and the process proceeds to step S52.

At step S52, the number of skin color pixels in each color evaluation area is compared with the number of skin color pixels Ci counted at step S38, and the process proceeds to step S53.

At step S53, with respect to both the vertical and horizontal directions, the amount of shift (shift amount) between the color evaluation area having the number of skin color pixels closest to the number of skin color pixels Ci and the previously set AF area Ae is detected as the object movement amount in the directions, and the process proceeds to step S54.

At step S54, the position of the next AF area Ae is determined based on the object movement amount in the vertical and horizontal directions detected at step S53, the number of skin color pixels Ci+1 in the area corresponding to the next AF area Ae in the current frame is counted, and the process proceeds to step S55.

At step S55, at a predetermined time, the position of the AF area for the image is moved and changed to the position of the next AF area Ae determined at step S54, and the process proceeds to step S56. Here, the predetermined time is, for example, immediately after the object movement amount is detected like at step S39, and for the image data read in the AF evaluation value calculator 14 immediately after the object movement amount is detected, the AF area Ae is set in the position moved based on the object movement amount.

At step S56, it is determined whether the shutter button 61 is fully depressed by the user into the S2 condition or not. In this example, when the shutter button 61 is in the S2 condition, the process proceeds to step S57, and when the shutter button 61 is not in the S2 condition, the process proceeds to step S58.

At step S58, setting is made so that the next i is i+1, and the process returns to step S51. By making setting so that the next i is i+1, for example, in the first operation flow from step S51 to step S56, Ci=C1, and in the second operation flow from step S51 to step S56, Ci=C2. Then, until the shutter button 61 is brought into the S2 condition, object color following AF to move and change the AF area in accordance with the movement of the object is performed while images are successively obtained by live view capturing.

At step S57, actual capturing to obtain a captured image for recording is performed, and the capturing operation flow is ended.

Next, the case where the process proceeds from step S33 to step S40 will be described.

At step S40, AF to follow the skin color, that is, object following AF is inhibited (OFF state), and the process proceeds to step S41.

At step S41, it is determined whether the shutter button 61 is fully depressed by the user into the S2 condition or not. In this example, when the shutter button 61 is in the S2 condition, the process proceeds to step S42, and the determination at step S41 is repeated until the shutter button 61 is brought into the S2 condition. In this example, since object following AF is inhibited, the AF area is fixed, and merely continuous AF is performed until the shutter button 61 is brought into the S2 condition.

At step S42, actual capturing to obtain a captured image for recording is performed, and the capturing operation flow is ended.

Figure 13:
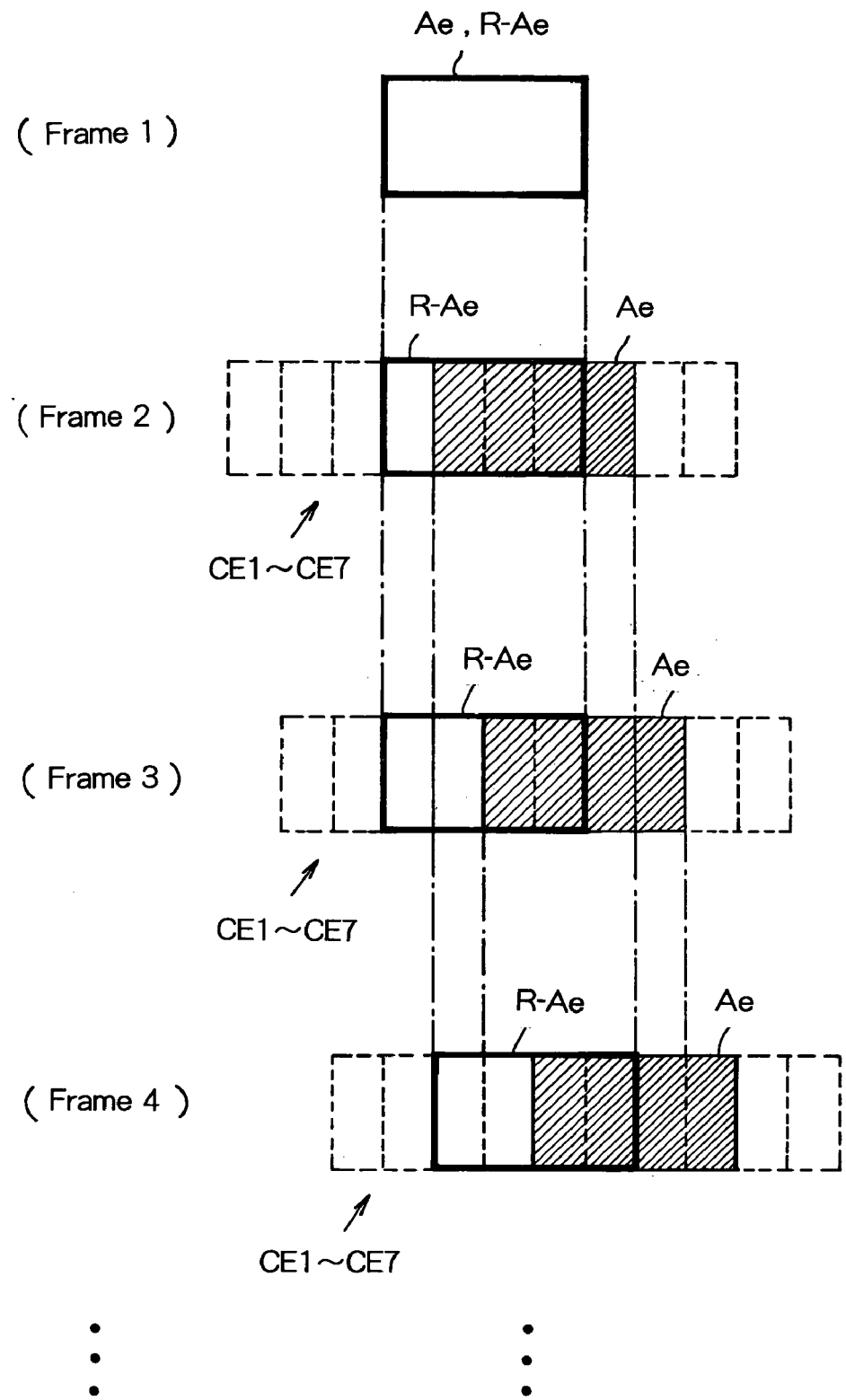
FIG. 13 is a view for explaining the difference between the area to be set as the AF area, and the actual AF area.

In the above description, ideally, the AF area Ae (the area set as the area to be set as the AF area) is the area actually used for the evaluation of the focus condition (the actual AF area) in the first image. However, since there is a difference between the timing of the AF area determination and the timing of the image obtaining in the above-described continuous AF processing, in actuality, there are cases where the position of the AF area Ae is somewhat different from that of the actual AF area, and this is permitted. That is, it is necessary only that the AF area Ae be the area in the position set as the area to be set as the AF area (to be used for the focus evaluation). Referring to FIG. 13, a case where the position of the AF area Ae is different from that of the actual AF will be described with respect to a concrete example.

FIG. 13 is a view for explaining the difference between the position of the AF area Ae and that of the actual AF area R-Ae. In this example, a plurality of images are obtained in the order of a frame 1, a frame 2, a frame 3, a frame 4, . . . . In this example, the AF area Ae is the-area for chromatic information comparison with the next frame, that is, at first, the AF area at the time of one-shot AF and then, the area determined to be the area to which the main object is moved, and set so as to be used for the evaluation of the focus condition by chromatic information comparison with the previous frame. That is, FIG. 13 shows the positional relationship between the actual AF area R-Ae and the AF area Ae for each frame, and the movement of the areas.

In FIG. 13, an example in which the main object moves rightward is shown for simplification of explanation, the area of the entire image in each frame is not shown, and the positional relationship among the AF area Ae corresponding to each frame, the actual AF area R-Ae and the color evaluation areas CE1 to CE7 is shown.

For example, first, at the point of time when the shutter button 61 is brought into the S1 condition and one-shot AF is performed, the actual AF area R-Ae is provided in the center of the image, and since object following AF is not started at this point of time, the positions of the actual AF area R-Ae and the AF area Ae coincide with each other. In this example, the image obtained at the point of time when one-shot AF is ended is the frame 1. That is, the actual AF area R-Ae and the AF area Ae are provided in the center of the frame 1.

When object following AF is started, for the frame 2, the actual AF area R-Ae is provided in the center of the image, and in the vicinity thereof, the color evaluation areas CE1 to CE7 are provided as shown in FIGS. 6 and 7. Then, by comparing the chromatic information of the AF area Ae of the frame 1 with the chromatic information of the color evaluation areas CE1 to CE7, the position of the color evaluation area CE5 is set as the position of the next AF area (AF area Ae).

In this example, while the above-described continuous AF is performed in parallel with the operation for moving the AF area, because of the time required for the calculation of the chromatic information and the like, the readout of (for example) the image data associated with the frame 3 from the CCD 11 and the calculation of the focus evaluation value with respect to the frame 3 are started at the time when the position of the next AF area Ae is determined.

Then, for the frame 3, the condition is such that the actual AF area R-Ae is held provided in. the center of the image. Then, the position of the next AF area Ae determined-based on the chromatic information of the color evaluation areas CE1 to CE7 of the frame 2 is reflected in the calculation of the focus evaluation value with respect to the frame 4.

On the other hand, by successively comparing the chromatic information of the AF area Ae set in the previous frame and the chromatic information of the color evaluation areas CE1 to CE7 provided with the AF area Ae as the center in the next frame, the position of the next AF area is determined.

Consequently, in such a case, since the result of the chromatic information comparison between the frame 1 and the frame 2 is reflected in the frame 4 and the actual AF area R-Ae is set as shown in FIG. 13, the position of the AF area (the area set as the area to be set as the AF area) Ae and that of the actual AF area R-Ae for the same frame are somewhat different from each other.

Therefore, the "area set so as to be used for the evaluation of the focus condition" cited in the present embodiment is ideally the "area actually used for the evaluation of the focus condition at that point of time", and further, includes the "area of the position set as the area to be used for the evaluation of the focus condition", in other words, the "area used for the evaluation of the focus condition in the future" in accordance with the relationship between the timing of the determination of the AF area Ae and the timing of the readout of the image data.

1-4-4. Movement and Change of the AF Area and an AF Area Pointer

In this example, the movement and change of the AF area Ae and an AF area pointer displayed on the LCD 20 will be concretely described.

Figure 14A:
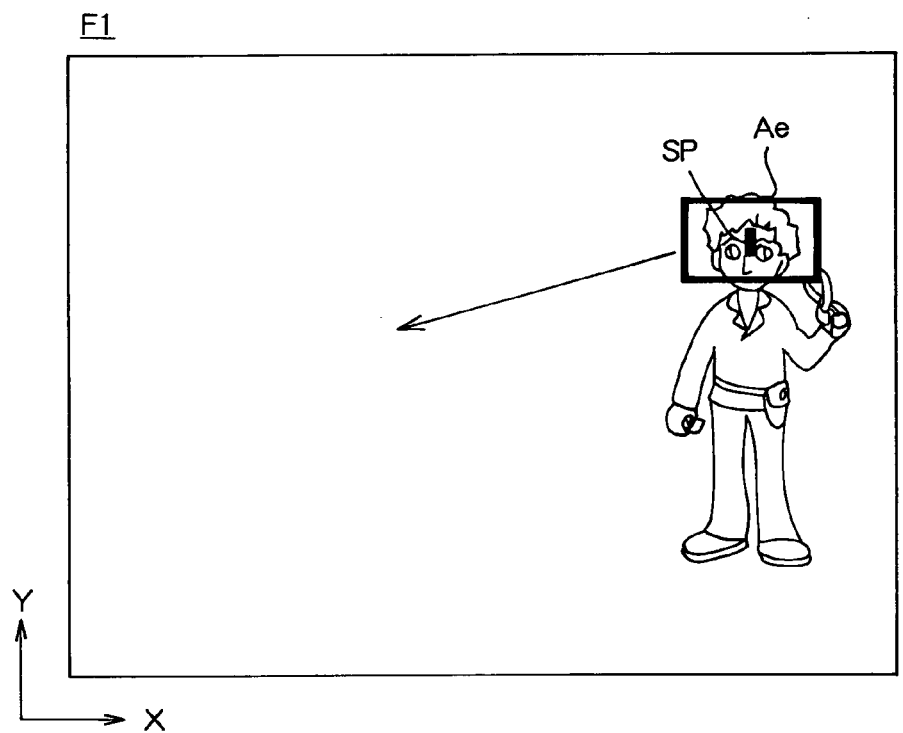
FIGS. 14A and 14B are views showing an example of a change of the AF area and an AF area pointer.
Figure 14B:
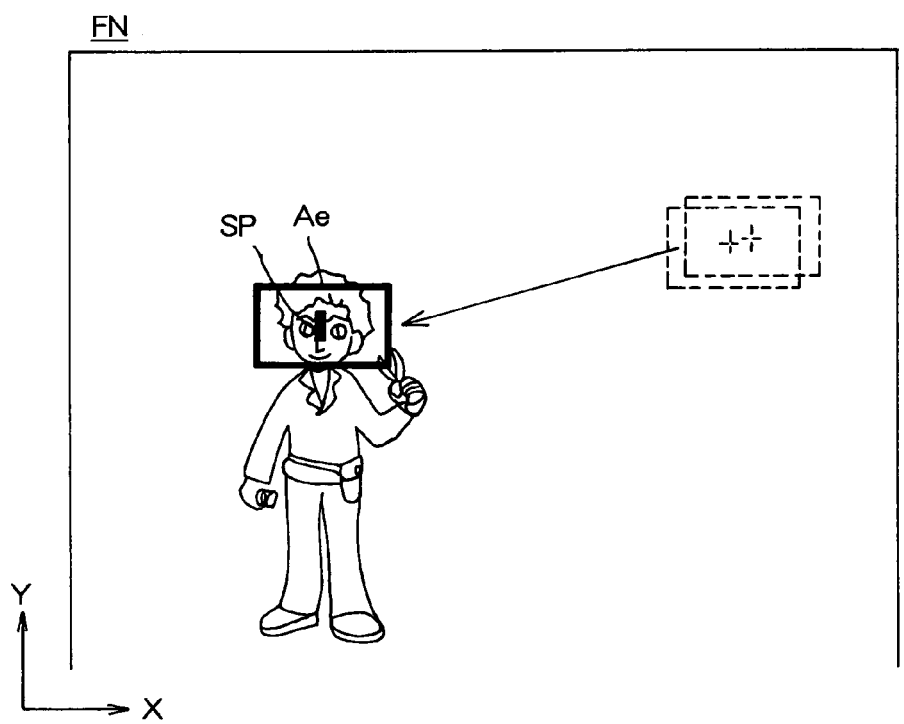

FIGS. 14A and 14B are views illustrating the change of the AF area Ae and an AF area pointer SP indicative of the position of the-main object. FIG. 14A shows, for example, an image (first frame) F1 immediately after one-shot AF, and FIG. 14B shows an image FN N frames later. The AF area pointer SP indicative of the object position is a display indicative of the position of the object on the live view image displayed on the LCD 20, and the LCD 20 displays the AF area pointer SP together with the live view image so as to be superimposed on the live view image. In FIGS. 14A and 14B, in order to clarify the positional relationship between the AF area Ae set for the image and the AF area pointer SP displayed on the live view image on the LCD 20, for convenience, the AF area Ae and the AF area pointer SP are both shown.

As described above, data representative of the object movement amount (the object movement amount in the vertical and horizontal directions) detected by the movement amount detector 34 is transmitted to the AF evaluation value calculator 14, the AF evaluation value calculator 14 moves the position of the AF area set for the image inputted from the AFE 12 based on the object movement amount detected by the movement amount detector 34 under the control of the camera controller 30 as shown in FIGS. 14A and 14B, and the position of the AF area pointer SP displayed on the LCD 20 is moved and changed by the driver 19.

For example, as shown in FIG. 14A, after the AF area Ae is set for the image F1 inputted to the AF evaluation value calculator 14 immediately after one-shot AF, the position of the AF area Ae is changed in accordance with the detected object movement amount, and as shown in FIG. 14B, the AF area Ae is changed and moved so as to follow the object. Consequently, since the object can be brought into focus while the object is being followed, the in-focus condition of the taking lens 10 can be maintained in response to the movement of the object.

Moreover, at this time, as shown in FIG. 14A, after the AF area pointer SP is displayed so as to be superimposed on the live view image displayed on the LCD 20 immediately after one-shot AF, the position of the AF area pointer SP is changed in accordance with the detected object movement amount, and as shown in FIG. 14B, the position of the. AF area pointer SP is changed so as to follow the object. That is, the driver 19 attains the function of changing the position of the AF area pointer SP on the image displayed on the LCD 20 based on the detected object movement amount. Consequently, the operator can grasp the condition of following of the object in the AF area Ae or the like by viewing the pointer SP on the live view image.

As described above, according to the image taking apparatus 1 of the first embodiment, AF is started in response to the depression of the shutter button 61 by the user, and a plurality of images are obtained in succession with a time interval while live view capturing is performed and the first and second images G1 and G2 are obtained in this order with a time interval. Then, the movement of the object is detected by comparing the chromatic information of the area, of the first image G1, set as the AF area Ae at that point of time with the chromatic information of the color evaluation areas (the area corresponding to the AF area and areas in the vicinity thereof) set for the second image G2. Information on the color of the image is not readily affected by defocus due to the forward and backward driving of the taking lens 10 in continuous AF. Consequently, the movement of the object can be accurately detected.

When a high-contrast object is taken, the movement of the object can be accurately detected also by following the brightness pattern where the main object is present with respect to a plurality of images obtained in succession with a time interval. However, for example, when a person s face where the contrast is low is the main object, it is generally difficult to detect a brightness pattern change, and it is considered that it is apt to be difficult to accurately detect the movement of the object. However, in the present embodiment, since the movement of the object can be accurately detected by following the color of the main object, the movement of the object can be accurately detected under various capturing conditions irrespective of the brightness.

Then, the position of the object region (AF area) for the evaluation of the focus condition set for the image is determined and moved based on the movement of the object detected by the comparison of the chromatic information. Consequently, the in-focus condition can be maintained in response to the movement of the object.

2. Second Embodiment

While in the image taking apparatus 1 according to the first embodiment, object following AF is realized by following the color of the main object and detecting the object movement amount, in an image taking apparatus 1A according to the second embodiment, the improvement of the accuracy of object following AF is attained by following the brightness pattern of the object and following the color of the main object.

FIG. 15 is a block diagram showing the principal functional structure of the image taking apparatus 1A according to the second embodiment. Since many of the parts of the principal functional structure of the image taking apparatus 1A shown in FIG. 15 are similar to those of the image taking apparatus 1 shown in FIG. 1, different parts will be mainly described in the following, and similar parts are denoted by the same reference numerals and descriptions thereof are omitted.

As shown in FIG. 15, a function for realizing object following AF by following the brightness pattern of the object is added to the function of the camera controller 30. Specifically, a brightness evaluation value calculator 36 calculating a brightness evaluation value for evaluating the brightness of the object is added to the camera controller 30 as a function, and a movement amount detector 34A detects the object movement amount based on the brightness evaluation value and the number of skin color pixels.

The capturing operation flow including the object following AF operation flow in the image taking apparatus 1A according to the second embodiment will be described.

Figure 16:
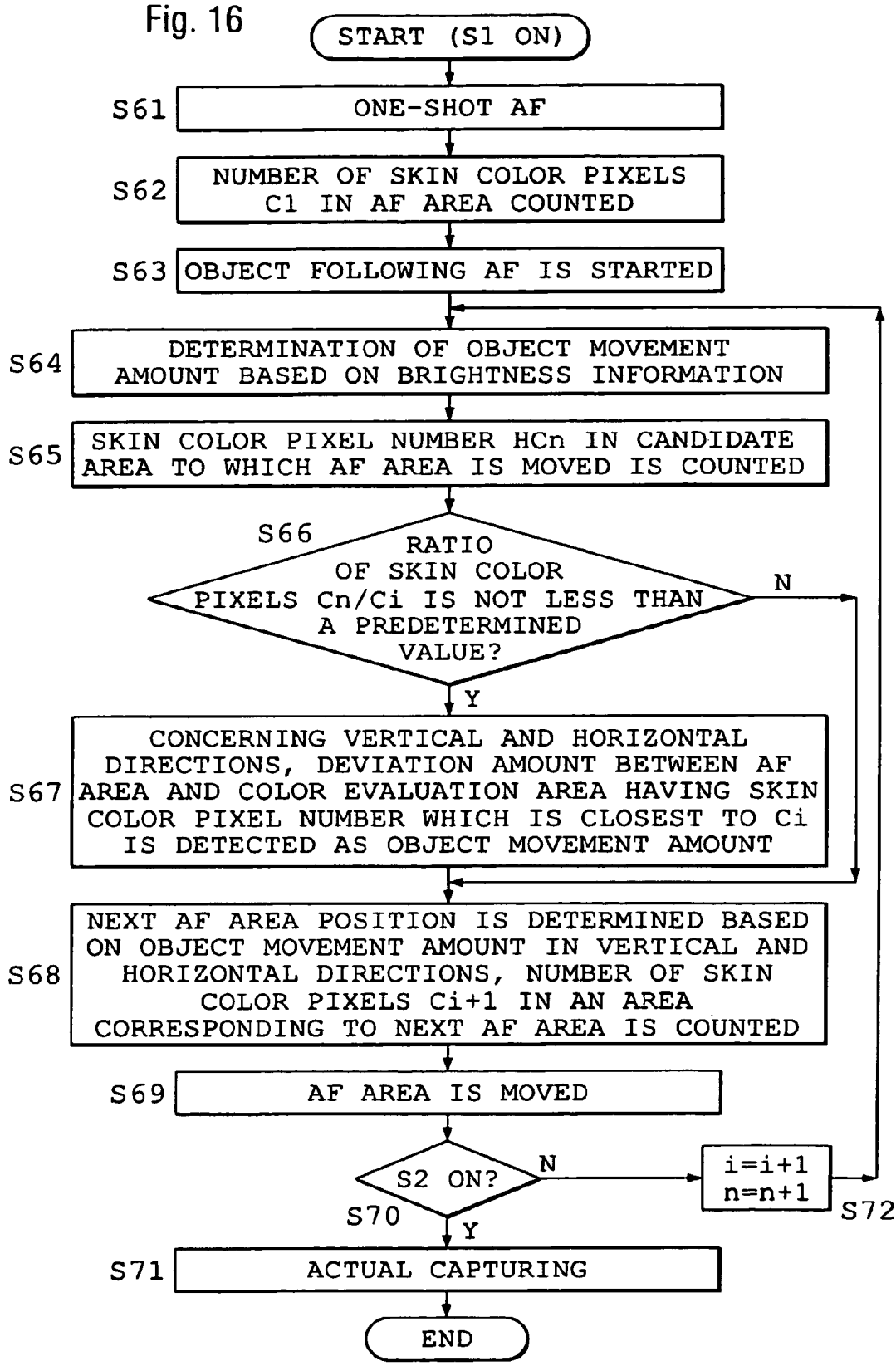
FIG. 16 is a flowchart illustrating a capturing operation flow including an object following AF operation flow according to the second embodiment.

FIG. 16 is a flowchart illustrating a capturing operation flow including an object following AF operation flow according to the second embodiment. This operation flow is realized under the control of the camera controller 30. In the operation flow shown in FIG. 16, attention is given to, of the object following AF, the movement of the AF area, and during the period from the end of one-shot AF to the setting of the S2 condition, the above-described continuous AF is performed in parallel with the operation flow for moving the AF area.

In this example, when the shutter button 61 is half depressed by the user into the S1 condition in the image taking standby state, the capturing operation flow is started, and the process proceeds to step S61.

At step S61, one-shot AF similar to that described in the first embodiment is performed, and the process proceeds to step S62. At the time of one-shot AF, the AF area Ae is set in the vicinity of the center of the image as described above.

At step S62, the number of pixels (the number of skin color pixels) C1 representative of the skin color in the AF area Ae is counted, and the process proceeds to step S63. In this example, of the pixels in the AF area Ae, the number of pixels showing the CbCr value belonging to the skin color region shown in FIG. 10 is counted.

At step S63, object following AF is started, and the process proceeds to step S64.

At step S64, the object movement amount is detected based on the brightness information, and the process proceeds to step S65. In this example, the color evaluation areas (for example, the color evaluation areas CE1 to CE7) are provided, for example, with respect to the position of the AF area Ae as described above. Then, the brightness evaluation value calculator 36 calculates the brightness evaluation value for evaluating the brightness such as the average value of the brightness values for the color evaluation areas, the movement amount detector 34A detects the color evaluation area of the image (for example, the second image) of the current frame having the brightness evaluation value (brightness pattern) closest to the brightness evaluation value of the AF area Ae of the image (for example, the first image) of the previous frame, and the amount of shift (shift amount) therebetween is detected as the object movement amount. That is, in this example, the brightness evaluation value calculator 36 and the movement amount detector 34A attain in cooperation with each other the function (second movement detection function) of detecting the movement of the object (in this example, the object movement amount).

At step S65, the area to which the AF area is moved which area is set for the next frame, that is, the area being a candidate for the AF area (candidate area) is determined based on the object movement amount detected at step S64, the number of skin color pixels HCn (n is a natural number) in the area, of the current frame, corresponding to the position of the candidate area is counted, and the process proceeds to step S66. That is, the camera controller 30 attains the function of determining, for the image obtained by the CCD 11, the candidate area set as the AF area next based on the object movement amount detected by the second movement detection function. Then, at step S65, the number of skin color pixels HCn satisfying the relationship ((TH5>Cb>TH7 AND TH11>Cr>TH9) OR (TH6>Cb>TH8 AND TH12>Cr>TH10)), that is, belonging to the skin color region shown in FIG. 10 is counted.

At step S66, it is determined whether or not the ratio of the number of skin color pixels HCn counted at step S65 to the number of skin color pixels C1 counted at step S62 or the number of skin color pixels Ci+1(i is a natural number) counted at step S68 described later (that is, HCn/Ci) is not more than a predetermined value (for example, 0.8). In this example, when a relationship HCn/Ci≦0.8 holds, the process proceeds to step S67, and when a relationship HCn/Ci>0.8 holds, the process proceeds to step S68. That is, the camera controller 30 attains the function of calculating the degree of the difference between the chromatic information of the AF area Ae of the first image G1 and the chromatic information of the area of the second image G2 corresponding to the candidate area.

At step S67, with respect to the frame next to the frame for which the number of skin color pixels is counted at step S62 or at step S68 described later, as described above, the number of skin color pixels satisfying the relationship ((TH5>Cb>TH7 AND TH11>Cr>TH9) OR (TH6>Cb>TH8 AND TH12>Cr>TH10)), that is, belonging to the color region shown in FIG. 10 is counted in the color evaluation areas (for example, the color evaluation areas CE1 to CE7) set so as to be slightly shifted in the vertical and horizontal directions with respect to the AF area Ae.

Then, with respect to both the vertical and horizontal directions, the movement amount detector 34A detects the amount of shift (shift amount) between the color evaluation area having the number of skin color pixels closest to the number of skin color pixels C1 counted at step S62 or the number of skin color pixels Ci+1 counted at step S68 described later and the AF area Ae, as the object movement amount in the directions, and the process proceeds to step S68.

At step S68, the position of the next AF area Ae is determined based on the object movement amount in the vertical and horizontal directions detected at step S64 or step S67, the number of skin color pixels Ci+1 in the area corresponding to the next AF area Ae in the current frame is counted, and the process proceeds to step S69.

In this example, when the process proceeds from step S66 to step S68, it is considered that the detection of the object movement amount based on the brightness information excellently reflects the movement of the main object having the skin color. Therefore, at step S68, the position of the next AF area Ae is determined based on the object movement amount detected by use of the brightness information at step S64. On the other hand, when the process proceeds from step S67 to step S68, in order to follow the movement of the main object having the skin color, the position of the next AF area Ae is determined based on the object movement amount detected by use of the number of skin color pixels at step S67.

At step S69, the position of the AF area for the image is moved and changed to the position of the AF area determined at step S68 at a predetermined time, and the process proceeds to step S70. Here, the predetermined time is, for example, immediately after the object movement amount is detected, and for the image data read in the AF evaluation value calculator 14 immediately after the object movement amount is detected, the AF area Ae is set in the position moved based on the object movement amount.

That is, when the degree of the difference between the chromatic information of the AF area Ae (first comparison area), of the first image G1, set so as to be used for the evaluation of the focus condition at that point of time and the chromatic information of the area on the second image G2 corresponding to the candidate area is not less than a predetermined value, the AF area mover 35 determines and moves the position of the AF area for the image obtained by the CCD 11, based on the object movement amount detected by the function of detecting the object movement amount based on the chromatic information (in this example, the number of skin color pixels)

From a different point of view, based on the chromatic information (in this example, information on the skin color, that is, the number of skin color pixels) on the image obtained by the CCD 11, the camera controller 30 performs control so that the detection of the object movement amount is performed by one of the function (first movement-detection function) of detecting the object movement amount based on the chromatic information (in this example, the number of skin color pixels) and the function (second movement detection) of detecting the object movement amount based on the brightness information.

At step S70, it is determined whether the shutter button 61 is fully depressed by the user into the S2 condition or not. In this example, when the shutter button 61 is in the S2 condition, the process proceeds to step S71, and when the shutter button 61 is not in the S2 condition, the process proceeds to step S72.

At step S72, setting is made so that the next i is i+1 and the next n is n+1, and the process returns to step S64. In this example, by making setting so that the next i and n are i+1 and n+1, respectively, for example, in the first operation flow from step S64 to step S70, Ci=C1 and HCn=HC1, and in the second operation flow from step S64 to step S70, Ci=C2 and HCn=HC2. Then, until the shutter button 61 is brought into the S2 condition, object color following AF to move and change the AF area in accordance with the movement of the object is performed while images are successively obtained by live view capturing.

At step S71, actual capturing to obtain a captured image for recording is performed, and the capturing operation flow is ended.

In this embodiment, there are also cases where the position of the AF area Ae in the first image is somewhat different from that of the area actually used for AF like in the first embodiment, and such a structure is included.

As described above, the area which is the candidate set as the next AF area (candidate area) is determined based on the movement amount detected based on the brightness information. Then, when the degree of the difference between the chromatic information of the AF area Ae, of the image (first image) of the previous frame, set so as to be used for the evaluation of the focus condition at that point of time and the chromatic information of the area on the second image corresponding to the candidate area is not less than a predetermined value, the AF area Ae is determined and moved based on the movement of the object detected based on the skin color information. Consequently, the reliability of the detected movement of the object and the reliability of the focusing control in response to the movement of the object can be improved.

Moreover, in cases such as when there are many persons in the captured image, because of the presence of the other skin colors, it is difficult to accurately detect the movement of the main object by following only the skin color. In such cases, the movement of the object can be accurately detected by detecting the movement of the object based on the brightness information. On the other hand, in cases such as when the brightness of the object is low or when the brightness of the object is uniform in the field of view (lack of contrast), it is difficult to accurately detect the movement of the main object by following the brightness pattern. Therefore, in such cases, the movement of the object can be accurately detected by detecting the movement of the object based on the skin color information.

That is, the reliability of the detected movement of the object can be improved by detecting the movement of the object while drawbacks of the brightness information and the skin color information are complemented with each other by advantages thereof. Consequently, accurate and highly reliable object following AF can be realized. In other words, since control is performed so that the movement of the object is detected by one of the two movement detection functions based on the chromatic information such as the number of skin color pixels with respect to the image associated with the object, the detection of the movement of the object and the focusing control in accordance with the condition of the object can be realized.

Further, in the present embodiment, since the movement of the object is detected based on information on the skin color, the movement of the object can be accurately detected when a person, that is, an object having a large skin color part is the main object.

3. Modification

While two embodiments of the present invention have been described, the present invention is not limited to the above-described contents.

While in the above-described embodiments, in cases where a main object having a large skin color part is followed such as when a person is the main object, the movement of the object is detected based on the number of pixels belonging to the color region representative of the skin color, that is, information on the skin color, the present invention is not limited thereto. For example, the movement of the object may be detected or the object movement detection function may be changed based on information on a color belonging to more than one color regions such as the skin color of the face and the like and the color of the hair. With this structure, the movement 6f the object can be more correctly and accurately detected by following a plurality of colors than by following one color.

While in the above-described second embodiment, of the methods of detecting the movement of the object, the method of detecting a brightness change is described as an example of methods other than the method of comparing the chromatic information, the present invention is not limited thereto. For example, various known methods such as the method of detecting a contrast change shown in the prior art and the passive phase difference method may be adopted.

While in the above-described embodiments, the movement of the object is detected by comparing the number of skin color pixels in the area corresponding to the AF area of the previous frame with the number of skin color pixels in the color evaluation area of the current frame every time the AF area is moved, the present invention is not limited thereto. For example, the movement of the object may be detected by comparing the number of skin color pixels detected with respect to the AF area with the number of skin color pixels in the color evaluation area of the successively obtained frame immediately after one-shot AF.

According to the above-described structure, since the movement of the object is detected by comparing the chromatic information of the first comparison area set on the first image with the chromatic information of a plurality of second comparison areas set for the second image while obtaining the first and second images in this order with a time interval, the movement of the object can be accurately detected.

Moreover, the in-focus condition can be maintained in response to the movement of the object by determining the position of the focus evaluation area set for the image based on the movement of the object detected by the chromatic information comparison.

Moreover, by determining the candidate area set as the focus evaluation area next based on the movement of the object separately detected based on information, other than the chromatic information, such as the brightness information, and determining the focus evaluation area based on the movement of the object detected by first movement amount detection when the degree of the difference between the chromatic information of the first comparison area set on the first image and the chromatic information of the area on the second image corresponding to the candidate area is not less than a predetermined value, the reliability of the focusing control in response to the movement of the object can be improved.

Moreover, by performing control so that the movement of the object is detected by one of the two movement detection functions based on the chromatic information of the image associated with the object, the detection of the movement of the object and the focusing control in response to the condition of the object can be realized.

Moreover, by detecting the movement of the object based on information on the skin color, the movement of the object can be accurately detected when a person, that is, an object having a large skin color part is the main object.

Moreover, since the second comparison areas are each set so as to include at least two areas of divisional comparison areas obtained by dividing one area on the second image into a plurality of areas, and to overlap at least one of the other second comparison areas, the calculation amount can be reduced.

Moreover, by detecting the movement of the object based on the number of pixels belonging to the region of a predetermined color on a two-dimensional color space or information on the size of a region belonging to the region of the predetermined color, the reliability of the detected object movement amount and the focusing control in response to the movement of the object can be improved while complicated calculation is suppressed.

Moreover, by changing the position of the display, indicative of the position of the object, displayed together with the image, based on the detected movement of the object, the operator can grasp the condition of following of the object.

Moreover, by detecting the movement of the object based on the chromatic information on the region of a plurality of colors on the color space by use of the first and second images obtained in this order with a time interval, the movement of the object can be more accurately detected.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image taking apparatus comprising:
   an image capturing part for obtaining a first image and a second image in this order with a time interval based on an optical image of an object;
   a first area setting part for setting a first comparison area for the first image;
   a second area setting part for setting a plurality of second comparison areas for the second image, each of the plurality of second comparison areas being composed of a plurality of narrow areas including at least one narrow area which overlaps the first comparison area and at least one narrow area which adjoins the first comparison area; and
   a first movement detector for detecting a movement of the object by comparing chromatic information of the first comparison area with chromatic information of the plurality of second comparison areas, said chromatic information of the plurality of second comparison areas being obtained by chromatic information of the plurality of narrow areas.

2. An image taking apparatus as claimed in claim 1, further comprising:
   a focus area determining part for determining a position of a focus evaluation area for evaluating a focus condition for the image obtained by the image capturing part based on the movement of the object detected by the first movement detector.

3. An image taking apparatus as claimed in claim 2, further comprising:
   a second movement detector for detecting a movement of the object;
   a candidate area determining part for determining a candidate area set as the focus evaluation area next for the image obtained by the image capturing part based on the movement of the object detected by the second movement detector; and
   a calculator for calculating a degree of a difference between the chromatic information of the first comparison area and the chromatic information of an area on the second image corresponding to the candidate area,
   wherein when the degree of the difference is not less than a predetermined amount, the focus area determining part determines the position of the focus evaluation area for the image obtained by the image capturing part based on the movement of the object detected by the first movement detector.

4. An image taking apparatus as claimed in claim 1, further comprising:
   a second movement detector for detecting a movement of the object; and a controller for performing control so that the movement of the object is detected by one of the first and second movement detectors based on the chromatic information on the image obtained by the image capturing part.

5. An image taking apparatus as claimed in claim 1, wherein the chromatic information includes information on a skin color.

6. An image taking apparatus as claimed in claim 1, wherein at least one of the plurality of second comparison areas is set, by the second area setting part, as an area including at least two of divisional comparison areas obtained by dividing one area on the second image into a plurality of areas, and overlapping at least one of the other of the plurality of second comparison areas, and the chromatic information of the at least one of the plurality of second comparison areas is obtained based on chromatic information of the plurality of divisional comparison areas.

7. An image taking apparatus as claimed in claim 1, wherein the chromatic information is information on a number of pixels belonging to a predetermined color region on a two-dimensional color space or on a size of a region belonging to the predetermined color region.

8. An image taking apparatus as claimed in claim 1, further comprising:
a display for displaying a position mark indicative of a position of the object together with the image obtained by the image capturing part; and
a changer for changing a position of the position mark on the image displayed by the display based on the movement of the object.

9. An image taking apparatus as claimed in claim 1, wherein the chromatic information includes information on a color belonging to a plurality of color regions.

10. A program in a computer readable medium by which a computer included in an image taking apparatus operates to cause the image taking apparatus to perform a process comprising:
obtaining a first image and a second image in this order with a time interval based on an optical image of an object;
setting a first comparison area for the first image;
setting second comparison areas for the second image, each of said second comparison areas being composed of a plurality of narrow areas including at least one narrow area which overlays the first comparison area and at least one narrow area which adjoins the first comparison area; and
detecting a movement of the object in a first detection manner in which chromatic information of the first comparison area is compared with chromatic information of the second comparison area, said chromatic information of the second comparison areas being obtained by chromatic information of the plurality of narrow areas.

11. A program in a computer readable medium as claimed in claim 10, said process further comprising:
determining a position of a focus evaluation area for evaluating a focus condition for the image obtained based on the movement of the object detected in the movement detection.

12. A program in a computer readable medium as claimed in claim 11, said process further comprising:
detecting a movement of the object in a second detection manner;

determining a candidate area set as the focus evaluation area next for the image obtained based on the movement of the object detected in the second detection manner; and
calculating a degree of a difference between the chromatic information of the first comparison area and the chromatic information of an area on the second image corresponding to the candidate area,
wherein when the degree of the difference is not less than a predetermined amount, the position of the focus evaluation area is determined for the image obtained based on the movement of the object detected in the first detection manner.

13. A program in a computer readable medium as claimed in claim 10, said process further comprising:
detecting a movement of the object in a second detection manner; and
performing a control so that the movement of the object is detected in one of the first and second movement detection manners based on the chromatic information on the image obtained.

14. A program in a computer readable medium as claimed in claim 10, wherein the chromatic information includes information on a skin color.

15. A program in computer readable medium as claimed in claim 10,
wherein at least one of the second comparison areas is set as an area including at least two of divisional comparison areas obtained by dividing one area on the second image into a plurality of areas, and overlapping at least one of the other second comparison areas, and
the chromatic information of the at least one of second comparison areas is obtained based on chromatic information of the plurality of divisional comparison areas.

16. A program in a computer readable medium as claimed in claim 10,
wherein the chromatic information is information on a number of pixels belonging to a predetermined color region on a two-dimensional color space or on a size of a region belonging to the predetermined color region.

17. A program in a computer readable medium as claimed in claim 10, said process further comprising:
displaying a position mark indicative of a position of the object together with the image obtained; and
changing a position of the position mark on the image displayed based on the movement of the object.

18. A program in a computer readable medium as claimed in claim 10,
wherein the chromatic information includes information on a color belonging to a plurality of color regions.

19. A program in a computer readable medium as claimed in claim 10,
wherein the computer readable medium is an optical disk.

20. A program in a computer readable medium as claimed in claim 10,
wherein the computer readable medium is a magnetic disc.

21. An image taking apparatus comprising:
an image capturing part for obtaining a first image and a second image in this order with a time interval based on an optical image of an object;
a first area setting part for setting a first comparison area for the first image;

a second area setting part for setting second comparison areas for the second image;

a first movement detector for detecting a movement of the object by comparing chromatic information of the first comparison area with chromatic information of the plurality of second comparison areas;

a second movement detector for detecting the movement of the object; and a controller for performing control so that the movement of the object is detected by one of the first and second movement detectors.

22. A program in a computer readable medium by which a computer included in an image taking apparatus operates to cause the image taking apparatus to perform a process comprising:

obtaining a first image and a second image in this order with a time interval based on an optical image of an object;

setting a first comparison area for the first image;

setting a second comparison area for the second image;

detecting a movement of the object in a first detection manner in which chromatic information of the first comparison area is compared with chromatic information of the second comparison area;

detecting the movement of the object in a second detection manner; and performing a control so that the movement of the object is detected in one of the first and second movement detection manners.

* * * * *

UNITED STATES PATENT AND TRADEMARK OFFICE
CERTIFICATE OF CORRECTION

PATENT NO. : 7,136,581 B2 Page 1 of 1
APPLICATION NO. : 10/901734
DATED : November 14, 2006
INVENTOR(S) : Shinichi Fujii It is certified that error appears in the above-identified patent and that said Letters Patent is hereby corrected as shown below:

Column 25:
Line 47, delete "overlays", insert --overlaps--.

Signed and Sealed this

Ninth Day of January, 2007

JON W. DUDAS
*Director of the United States Patent and Trademark Office*